US012277904B2

(12) United States Patent
Kim

(10) Patent No.: US 12,277,904 B2
(45) Date of Patent: Apr. 15, 2025

(54) DISPLAY PANEL AND DISPLAY DEVICE INCLUDING THE SAME

(71) Applicant: LG Display Co., Ltd., Seoul (KR)

(72) Inventor: Dong Kyu Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/242,966

(22) Filed: Sep. 6, 2023

(65) Prior Publication Data

US 2024/0194138 A1 Jun. 13, 2024

(30) Foreign Application Priority Data

Dec. 12, 2022 (KR) ........................ 10-2022-0172887

(51) Int. Cl.
*G09G 3/3233* (2016.01)
*G09G 3/20* (2006.01)
*G09G 3/3266* (2016.01)

(52) U.S. Cl.
CPC ......... *G09G 3/3233* (2013.01); *G09G 3/2096* (2013.01); *G09G 3/3266* (2013.01); *G09G 2300/0426* (2013.01); *G09G 2300/0809* (2013.01); *G09G 2310/0286* (2013.01); *G09G 2320/02* (2013.01); *G09G 2320/043* (2013.01)

(58) Field of Classification Search
CPC .. G09G 3/3233; G09G 3/2096; G09G 3/3266; G09G 2300/0426; G09G 2300/0809; G09G 2310/0286; G09G 2320/02; G09G 2320/043
See application file for complete search history.

(56) References Cited

U.S. PATENT DOCUMENTS

| | | | | |
|---|---|---|---|---|
| 6,467,057 B1 * | 10/2002 | Wang | G09G 3/3677 | 714/726 |
| 7,952,551 B2 * | 5/2011 | Kawata | H01L 27/124 | 345/92 |
| 8,284,377 B2 * | 10/2012 | Hsu | G09G 3/3677 | 349/55 |
| 9,898,985 B2 * | 2/2018 | Cao | G02F 1/1368 | |
| 10,453,406 B2 * | 10/2019 | Jang | G09G 3/3611 | |

(Continued)

FOREIGN PATENT DOCUMENTS

| | | |
|---|---|---|
| EP | 4 134 944 A1 | 2/2023 |
| KR | 10-2019-0048510 A | 5/2019 |

(Continued)

OTHER PUBLICATIONS

United Kingdom Office Action and Search Report for United Kingdom Application No. GB2316581.4, dated Apr. 18, 2024.

*Primary Examiner* — Michael J Jansen, II
(74) *Attorney, Agent, or Firm* — Birch, Stewart, Kolasch & Birch, LLP

(57) ABSTRACT

A display device can include at least one subpixel connected to a data line and a gate line; a first gate driving circuit connected to a first end of the gate line; a second gate driving circuit connected to a second end of the gate line, the second end being opposite to the first end. Also, the first and second gate driving circuits are configured to double feed gate pulses to the first and second ends of the gate line based on a first condition being satisfied, and single feed the gate pulse to only one of the first and second ends of the gate line based on a second condition being satisfied.

17 Claims, 26 Drawing Sheets

(56) References Cited

U.S. PATENT DOCUMENTS

| | | | | |
|---|---|---|---|---|
| 10,832,607 | B2 * | 11/2020 | Huang | G09G 3/006 |
| 11,705,083 | B2 * | 7/2023 | Kim | G09G 3/006 345/204 |
| 11,735,113 | B2 * | 8/2023 | Dong | G09G 3/3241 345/204 |
| 11,798,483 | B1 * | 10/2023 | Ha | G09G 3/3258 |
| 11,875,747 | B2 * | 1/2024 | Huangfu | G09G 3/3258 |
| 12,057,087 | B2 * | 8/2024 | Ozawa | G09G 3/20 |
| 2008/0012812 | A1 * | 1/2008 | Kawata | G09G 3/3648 257/E27.113 |
| 2008/0165110 | A1 * | 7/2008 | Kim | G11C 19/28 257/E27.111 |
| 2010/0201902 | A1 * | 8/2010 | Hsu | G02F 1/136259 445/2 |
| 2017/0256216 | A1 * | 9/2017 | Cao | G09G 3/36 |
| 2018/0190218 | A1 * | 7/2018 | Jang | G09G 3/2096 |
| 2020/0090776 | A1 | 3/2020 | Wang | |
| 2020/0105173 | A1 * | 4/2020 | Huang | G09G 3/3648 |
| 2021/0225219 | A1 | 7/2021 | Qiu | |
| 2022/0084479 | A1 * | 3/2022 | Kim | G09G 3/3648 |
| 2022/0375408 | A1 * | 11/2022 | Dong | G09G 3/3241 |
| 2023/0042966 | A1 * | 2/2023 | Huangfu | G09G 3/3258 |
| 2023/0047265 | A1 * | 2/2023 | Ooghe | G09G 3/3648 |
| 2023/0206874 | A1 * | 6/2023 | Ban | G09G 3/3266 345/214 |
| 2024/0105141 | A1 * | 3/2024 | Ozawa | G09G 3/20 |
| 2024/0169874 | A1 * | 5/2024 | Choi | G09G 3/3233 |
| 2024/0194138 | A1 * | 6/2024 | Kim | G09G 3/3266 |

FOREIGN PATENT DOCUMENTS

| | | | |
|---|---|---|---|
| KR | 10-2019-0073703 | A | 6/2019 |
| WO | WO 2020/062366 | A1 | 4/2020 |

* cited by examiner

DISPLAY PANEL AND DISPLAY DEVICE INCLUDING THE SAME

CROSS-REFERENCE TO RELATED APPLICATION

This application claims priority under 35 U.S.C. § 119(a) to Korean Patent Application No. 10-2022-0172887, filed in the Republic of Korea on Dec. 12, 2022, the disclosure of which is incorporated by reference in its entirety into the present application.

BACKGROUND

1. Field

The present disclosure relates to a display panel and a display device including the same.

2. Discussion of Related Art

Electroluminescent display devices are generally classified into inorganic light emitting display devices and organic light emitting display devices according to the materials of the light emitting layers. Active matrix type organic light emitting display devices include organic light-emitting diodes (hereinafter referred to as "OLEDs"), which emit light by themselves (e.g., not backlight unit is needed), and have fast response speeds and advantages of high light emission efficiencies, improved brightness, and wide viewing angles.

In the organic light-emitting display devices, the OLEDs are formed in pixels. Since the organic light-emitting display devices have fast response speeds and are excellent in light emission efficiency, brightness, and viewing angle as well as being able to exhibit a black gradation in a full black color (e.g., true black), the organic light-emitting display devices are excellent in a contrast ratio and color reproducibility.

A pixel circuit of an electroluminescent display device includes a light emitting element, a driving element for driving the light emitting element, and one or more switch elements. The switch elements are turned on/off depending on a gate voltage to connect or disconnect main nodes of the pixel circuit. The driving element and the switch elements can be implemented with transistors.

The display panel can include a gate driving circuit. The gate driving circuit generates gate pulses applied to gate electrodes of the switch elements constituting the pixel circuit. However, sometimes the gate driving circuit may begin to operate abnormally, which can impair image quality and detract from the user's viewing experience.

For instance, when the gate driving circuit begins to operate abnormally, the user may notice image defects and have to manually turn on and turn off the device, in the hopes of resetting the device to normal operation, which is undesirable. Also, sometimes wiring lines can become disconnected within the display panel (e.g., due to impacts or excessive bending) which can cause a gate driving circuit to operate abnormally, which can impair image quality and shorten the lifespan of the device.

SUMMARY OF THE DISCLOSURE

The present disclosure is directed to solving or addressing the aforementioned needs and/or limitations associated with the related art.

The present disclosure provides a display panel capable of driving gate lines of a display panel and a display device including the display panel, in which gate driving circuits are disposed on both sides of the display panel, and when one of the gate driving circuits starts to operate abnormally, the gate lines of the display panel are driven by the other gate driving circuit which is still operating normally.

The problems or limitations to be solved or addressed by the present disclosure are not limited to those mentioned above, and other problems or limitations not mentioned will be clearly understood by those skilled in the art from the following description.

A display panel according to one embodiment of the present disclosure can include a plurality of data lines to which data signals are applied; a plurality of gate lines to which gate pulses are applied; a plurality of pixel circuits connected to corresponding data line among the data lines and connected to corresponding gate line among the gate lines; a first gate driving circuit configured to supply the gate pulse to one end of the gate lines; a second gate driving circuit configured to supply the gate pulse to the other end of the gate lines; a first feedback line connected to an output node of the first gate driving circuit; and a second feedback line connected to an output node of the second gate driving circuit. When the first and second gate driving circuits are normally driven, the gate pulses output from the first and second gate driving circuits can be double-fed to the corresponding gate line. When one of the first and second gate driving circuits begins to operate abnormally, the gate pulse output from the other gate driving circuit can be single-fed to the corresponding gate line.

The first and second feedback lines can be connected to one of the gate lines.

The first and second feedback lines can be electrically separated from the gate lines.

Each of the pixel circuits can include a light emitting element including an anode electrode and a cathode electrode; and a driving element configured to supply a current to the light emitting element, and at least one of a switch element configured to supply a pixel driving voltage in response to the gate pulse and a switch element configured to form a current path between the driving element and an anode electrode of the light emitting element in response to the gate pulse is further included.

The display panel can further include: a clock line configured to supply a clock to a CLK node of the first gate driving circuit; and a clock line configured to supply a clock to a CLK node of the second gate driving circuit; in which the clock is input to the CLK nodes of the first gate driving circuit and the second gate driving circuit when the gate pulse is double-fed to a corresponding gate line. A DC voltage can be applied to the CLK node of any one of the first gate driving circuit and the second gate driving circuit when the gate pulse is single-fed to a corresponding gate line. The clock swings between a gate-on voltage and a gate-off voltage. The DC voltage can maintain the gate-off voltage while the gate pulse is single-fed to the corresponding gate line. Each of the first gate driving circuit and the second gate driving circuit can include at least one switch element. The switch element can be turned on depending on the gate-on voltage and turned off depending on the gate-off voltage.

Each of the first and second gate driving circuits can include a first output node connected to the corresponding gate line to output the gate pulse. The first feedback line is connected to a first output node of the first gate driving circuit. The second feedback line is connected to a first output node of the second gate driving circuit.

The first gate driving circuit can include: a first output node connected to the corresponding gate line to output the gate pulse; and a second output node connected to the first feedback line. The second gate driving circuit can include: a first output node connected to the corresponding gate line to output the gate pulse; and a second output node connected to the second feedback line.

The display panel can further include: a first clock switching circuit connected to the CLK node of the first gate driving circuit to selectively supply the clock and the gate-off voltage; and a second clock switching circuit connected to the CLK node of the second gate driving circuit to selectively supply the clock and the gate-off voltage.

Each of the first and second clock switching circuits can include: an auxiliary power line connected to a first resistor to which the gate-on voltage is applied to one end and to which the gate-off voltage is applied to the other end; a transistor turned on depending on the gate-on voltage applied through the auxiliary power line to supply the clock to the CLK node; and a second resistor connected between the transistor and the CLK node and to which the gate-off voltage is applied. The transistor can be turned off depending on the gate-off voltage applied through the first resistor when the auxiliary power line is disconnected.

Each of the first and second clock switching circuits can include: an auxiliary power line connected to a first resistor to which the gate-on voltage is applied to one end and to which the gate-off voltage is applied to the other end; a p-channel transistor including a gate electrode connected to a node between the auxiliary power line and the first resistor and turned on depending on the gate-on voltage to supply the clock to the CLK node; and an n-channel transistor including a gate electrode connected to a node between the auxiliary power line and the first resistor and turned off depending on the gate-on voltage and turned on depending on the gate-off voltage to supply the gate-off voltage to the CLK node. The p-channel transistor can be turned off depending on the gate-off voltage applied through the first resistor when the auxiliary power line is disconnected.

The auxiliary power line can include a single metal layer wiring or two metal layer wirings connected through a contact hole penetrating an insulating layer.

A display panel according to another embodiment of the present disclosure includes a plurality of data lines to which data signals are applied; a plurality of gate lines to which gate pulses are applied; a plurality of pixel circuits connected to corresponding data line among the data lines and connected to corresponding gate line among the gate lines; a first gate driving circuit configured to supply gate pulses to one end of the gate lines; a second gate driving circuit configured to supply gate pulses to the other ends of the gate lines; a first clock switching circuit configured to selectively supply a clock and a DC voltage to a CLK node of the first gate driving circuit; and a second clock switching circuit configured to selectively supply a clock and a DC voltage to a CLK node of the second gate driving circuit. When the first and second gate driving circuits are operating normally, the gate pulses output from the first and second gate driving circuits can be double-fed to the corresponding gate line. When one of the first and second gate driving circuits begins to operate abnormally, then the gate pulse output from the other gate driving circuit can be single-fed to the corresponding gate line.

The display device according to the present disclosure can include one of the display panels; and a timing controller configured to compare feedback signals from the first and second feedback lines with a previously stored normal pattern to determine whether each of the first and second gate driving circuits is operating normally. When the first and second gate driving circuits are operating normally under the control of the timing controller, the gate pulses output from the first and second gate driving circuits can be double-fed to corresponding gate lines. When one of the first and second gate driving circuits is operating abnormally under the control of the timing controller, then the gate pulse output from the other gate driving circuit can be single-fed to the corresponding gate line.

According to the present disclosure, a gate driver driving abnormally among gate drivers can be sensed and thus a gate pulse can be applied to a gate line of a display panel by single-feeding.

The display device according to the present disclosure can continue to display images normally even if one of the gate drivers disposed on both sides of the display panel is damaged or malfunctions by single-feeding an EM pulse whose switching characteristics have little effect on the images reproduced on the display panel among gate signals.

A display panel and display device according to the present disclosure, a driving failure can be prevented, and a low-power operation can be realized.

Effects which can be achieved by the present disclosure are not limited to the above-mentioned effects. That is, other objects that are not mentioned can be obviously understood by those skilled in the art to which the present disclosure pertains from the following description.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, in which.

DETAILED DESCRIPTION OF THE EMBODIMENTS

Figure 1:
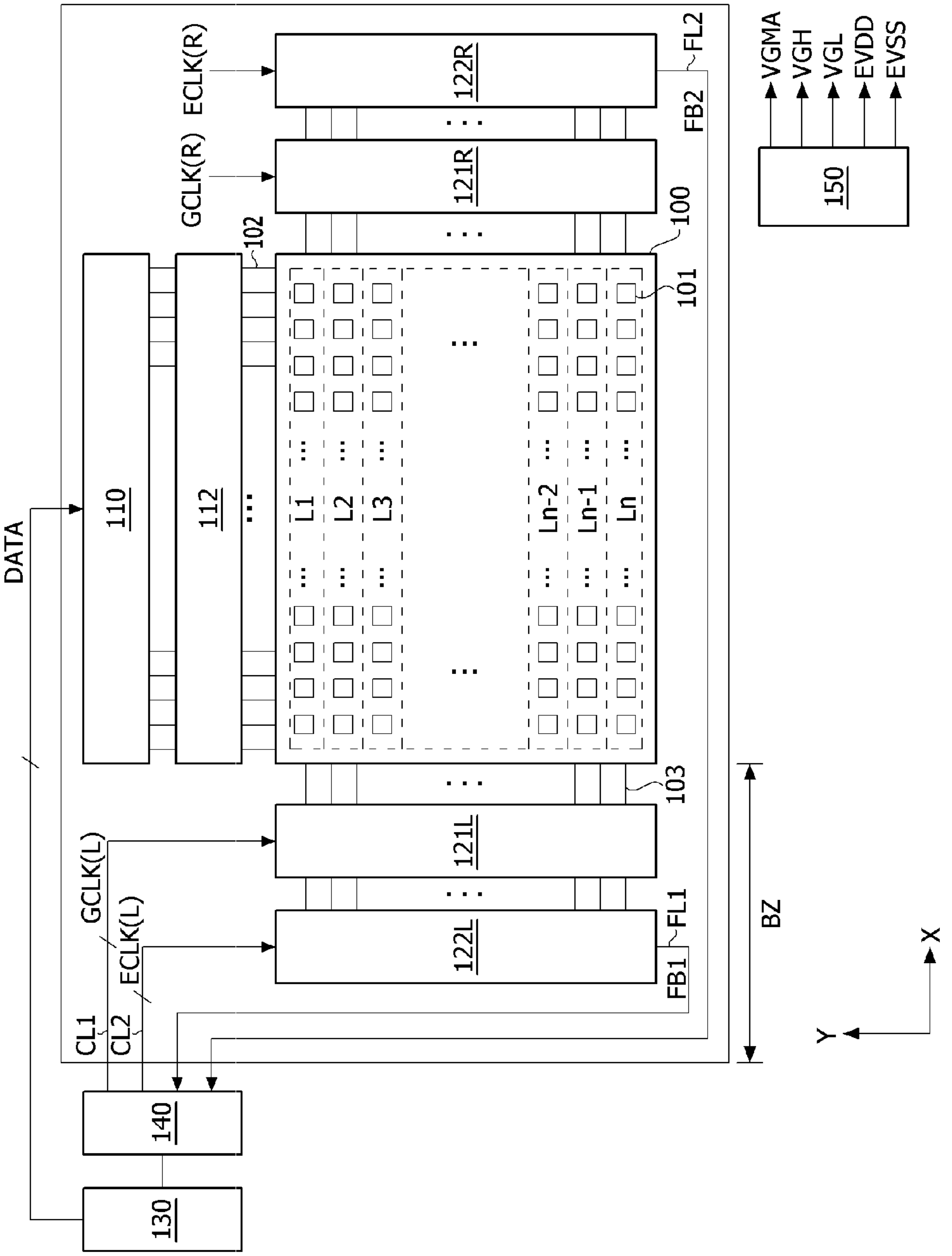
FIG. 1 is a block diagram showing a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies can be omitted to avoid unnecessarily obscuring the subject matter of the present disclosure.

The terms such as "comprising," "including," "having," etc. used herein are generally intended to allow other components to be added unless the terms are used with the term "only." Any references to singular can include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components can be interposed between them, unless "immediately" or "directly" is used.

When a temporal antecedent relationship is described, such as "after," "following," "next to," "before," or the like, it may not be continuous on a time base unless "immediately" or "directly" is used.

The terms "first," "second," and the like can be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

A pixel circuit and a gate driving circuit according to an embodiment of the present disclosure can include a plurality of transistors. The transistor can be implemented with a thin film transistor (TFT) and can be an oxide TFT including an oxide semiconductor or an LTPS TFT including low temperature poly silicon (LTPS).

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the situation of an n-channel transistor, since carriers are electrons, a source voltage is a voltage lower than a drain voltage such that electrons can flow from a source to a drain. The n-channel transistor has a direction of a current flowing from the drain to the source. In the situation of a p-channel transistor (p-channel metal-oxide semiconductor (PMOS)), since carriers are holes, a source voltage is higher than a drain voltage such that holes can flow from a source to a drain. In the p-channel transistor, since holes flow from the source to the drain, a current flows from the source to the drain. It should be noted that a source and a drain of a transistor are not fixed. For example, a source and a drain can be changed according to an applied voltage. Therefore, the disclosure is not limited due to a source and a drain of a transistor. In the following description, a source and a drain of a transistor will be referred to as a first electrode and a second electrode.

A gate pulse swings between a gate-on voltage and a gate-off voltage. The transistor is turned on in response to the gate-on voltage, while it is turned off in response to the gate-off voltage. In the situation of an n-channel transistor, the gate-on voltage can be a gate-high voltage VGH, and the gate-off voltage can be a gate-on voltage VGL. In the situation of a p-channel transistor, the gate-on voltage can be the gate-on voltage VGL and the gate-off voltage can be the gate-high voltage VGH.

Hereinafter, various embodiments of the present disclosure will be described in detail with reference to the accompanying drawings. In the following embodiments, a display device will be described based on an organic light emitting display device, but the present disclosure is not limited thereto. All the components of each display device according to all embodiments of the present disclosure are operatively coupled and configured.

Figure 2:
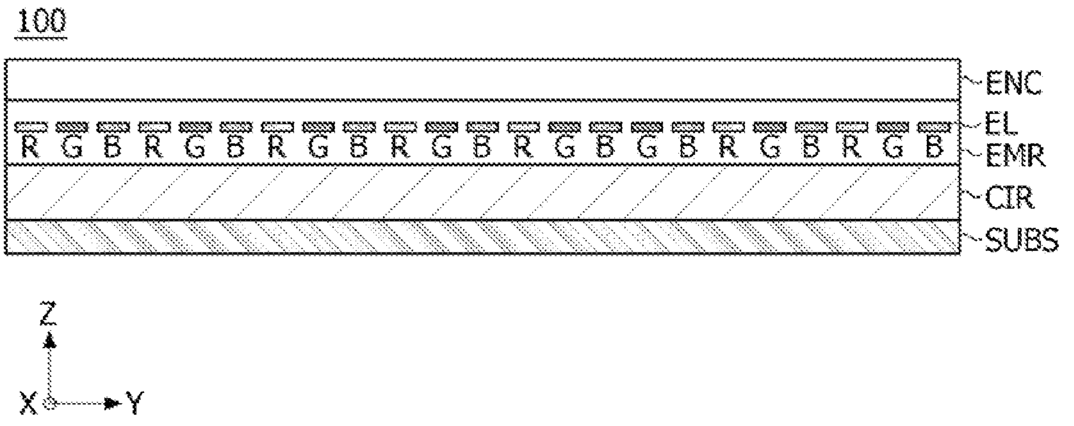
FIG. 2 is a cross-sectional view showing a cross-sectional structure of a display panel shown in FIG. 1 according to an embodiment of the present disclosure.

FIG. 1 is a block diagram showing a display device according to one embodiment of the present disclosure. FIG. 2 is a cross-sectional view showing a cross-sectional structure of the display panel shown in FIG. 1.

Referring to FIGS. 1 and 2, the display device according to an embodiment of the present disclosure includes a display panel 100, a display panel driver for writing pixel data to pixels of the display panel 100, and a power supply 150 generating power for driving the pixels and the display panel driver.

The display panel 100 can have a rectangular structure having a length in the X-axis direction, a width in the Y-axis direction, and a thickness in the Z-axis direction. The display area of the display panel 100 includes a pixel array displaying an input image. The pixel array includes a plurality of data lines 102 (e.g., DL), a plurality of gate lines 103 intersecting the data lines 102, and pixels arranged in a matrix form. The display panel 100 can further include clock lines CL1 and CL2, feedback lines FL1 and FL2, power lines, and the like. The clock lines CL1 and CL2 are connected to input nodes of the gate drivers 121L to 122R to supply clocks GCLK(L) to ECLK(R) to the gate drivers 121L to 122R. The feedback lines FL1 and FL2 are connected to output nodes of the gate drivers 121L to 122R and transmit feedback signals indicating output state information of the gate drivers 121L to 122R to a timing controller 130. The power lines supply constant voltages required to drive the pixels 101 and the gate drivers 121L to 122R.

The cross-sectional structure of the display panel 100 can include a circuit layer CIR, a light emitting element layer EMR, and an encapsulation layer ENC stacked on a substrate SUBS, as shown in FIG. 2.

The circuit layer CIR can include wirings such as the data lines 102 (e.g., DL), the gate lines 103, the clock lines CL1 and CL2, the feedback lines FL1 and FL2, power lines, the pixel circuits of pixels 101, a circuit of the demultiplexer 112, circuits of the gate drivers 121L to 122R, and the like. The lines and circuit elements of the circuit layer CIR can include a plurality of insulating layers, two or more metal layers separated with an insulating layer interposed therebetween, and an active layer of a TFT including a semiconductor material.

Each of the pixels 101 can be divided into a red sub-pixel, a green sub-pixel, and a blue sub-pixel for color implementation. Each of the pixels can further include a white sub-pixel. Each of the sub-pixels can include a pixel circuit. Hereinafter, a pixel can be interpreted as having the same meaning as a sub-pixel. The pixel circuit is connected to a corresponding data line among the data lines 102 and connected to a corresponding gate line among the gate lines 103. All pixel circuits in the display area can be connected to power lines in common.

The light emitting element layer EMR can include a light emitting elements EL driven by a pixel circuit. The light emitting element layer EMR can include the light emitting element EL of the red sub-pixel R, the light emitting element EL of the green sub-pixel G, and the light emitting element EL of the blue sub-pixel B. The sub-pixels of each color R, G, and B can include a white light emitting element and a color filter. The light emitting elements EL of the light emitting element layer EMR can be covered by multiple protective layers including an organic layer and a passivation layer.

The light emitting element EL can be implemented with an OLED. The OLED includes an organic compound layer formed between an anode electrode and a cathode electrode. The organic compound layer includes a hole injection layer (HIL), a hole transport layer (HTL), an emission layer (EML), an electron transport layer (ETL), and an electron injection layer, (EIL), but is not limited thereto. When a voltage is applied to the anode and cathode electrodes of the OLED, holes passed through the hole transport layer (HTL) and electrons passed through the electron transport layer (ETL) can be moved to the light emitting layer (EML) to form excitons. In this situation, visible light is emitted from the light emitting layer (EML). The OLED used as a light emitting element EL can have a tandem structure in which a plurality of light emitting layers are stacked. The OLEDs with the tandem structure can improve the luminance and lifetime of pixels.

The encapsulation layer ENC covers the light emitting element layer EMR to seal the circuit layer CIR and the light emitting element layer EMR. The encapsulation layer ENC can have a multi-layer insulating film structure in which an organic film and an inorganic film are alternately stacked. The inorganic film can block the penetration of moisture and oxygen. The organic film can planarize the surface of the inorganic film. When the organic film and the inorganic film are stacked in multiple layers, a movement path of moisture or oxygen becomes longer than that in a single layer, so that the penetration of moisture and oxygen affecting the light emitting element layer EMR can be effectively blocked.

A touch sensor layer can be formed on the encapsulation layer ENC, and a polarizing plate or a color filter layer can be disposed thereon. The touch sensor layer can include capacitive touch sensors that sense a touch input based on a change in capacitance before and after the touch input. The touch sensor layer can include insulating films and metal wiring patterns that form the capacitance of the touch sensors. The insulating films can insulate intersecting portions in the metal wiring patterns and can planarize the surface of the touch sensor layer. The polarizing plate can improve visibility and contrast ratio by converting the polarization of external light reflected by the metal of the circuit layer and the touch sensor layer. The polarizing plate can be implemented as a circular polarizing plate or a polarizing plate in which a linear polarizing plate and a phase retardation film are bonded. A cover glass can be bonded to the polarizing plate. The color filter layer can include red, green, and blue color filters. The color filter layer can further include a black matrix pattern. The color filter layer can absorb a portion of the wavelength of light reflected from the circuit layer and the touch sensor layer to replace the polarizing plate and increase the color purity of an image reproduced in the pixel array.

The pixel array of the display panel 100 can include a plurality of pixel lines L1 to Ln. Each of the pixel lines L1 to Ln includes pixels of one line arranged along a line direction (X-axis direction) in the pixel array of the display panel 100. The pixels arranged in one pixel line can share the gate lines 103. The sub-pixels arranged in a column direction Y along a data line direction can share the same data line 102 (e.g., DL). One horizontal period can be a time period obtained by dividing one frame period by the total number of the pixel lines L1 to Ln.

The display panel 100 can be implemented with a non-transmissivity display panel or a transmissivity display panel. The transmissivity display panel can be applied to a transparent display device in which an image is displayed on a screen and a real object in the background is visible. The display panel 100 can be made of a flexible display panel that is flexibly bent.

The pixel circuit includes a light emitting element EL, a driving element for driving the light emitting element EL, and one or more switch elements. The switch elements are turned on/off depending on the gate-on voltage of the gate pulse to connect or disconnect main nodes of the pixel circuit. The switch elements are turned on in response to a gate-on voltage, whereas they are turned off in response to a gate-off voltage.

There can be a difference in electrical characteristics of a driving element between the sub-pixels due to a process variation and an element characteristic variation caused in the manufacturing process of the display panel 100, and this difference can be more increased as the driving time of the pixels elapses. In order to compensate for the electrical characteristic variation of the driving element between pixels, an internal compensation circuit can be built into the pixel circuit or can be connected to an external compensation circuit. The internal compensation circuit can be built into the pixel circuit to sense a threshold voltage variation of the driving element and compensate for a gate-source voltage of the driving element by the threshold voltage variation. The external compensation circuit can compensate for a specific electrical characteristic variation of the driving element by generating a compensation value based on a result of sensing the electrical characteristics of the driving element using the external compensation circuit connected to the pixel circuit.

The pixels 101 can be arranged as real color pixels and pentile pixels. The pentile pixel can implement a higher resolution than a real color pixel by driving two sub-pixels having different colors as one pixel 101 using a preset pixel rendering algorithm. The pixel rendering algorithm can compensate for insufficient color representation in each pixel with the color of light emitted from an adjacent pixel.

The power supply 150 generates a direct current (DC) voltage (or constant voltage) required to drive the pixel array of the display panel 100 and the display panel driver by using a DC-DC converter. The DC-DC converter can include a charge pump, a regulator, a buck converter, a boost converter, and the like. The power supply 150 can adjust the level of a DC input voltage applied from a host system to generate constant voltages such as a gamma reference voltage VGMA, a gate-off voltage VGH, a gate-off voltage VGL, a pixel driving voltage EVDD, a pixel driving voltage EVDD, a cathode voltage EVSS, and the like. The gamma reference voltage VGMA is supplied to the data driver 110. The gate-off voltage VGH and the gate-on voltage VGL can be supplied to the gate drivers 121L to 122R and a level shifter 140. The pixel driving voltage EVDD and the cathode voltage EVSS are constant voltages for driving the pixel circuits. The pixel driving voltage EVDD and the cathode voltage EVSS are supplied to the pixels 101 through power lines commonly connected to the pixels 101.

The display panel driver writes pixel data of an input image into pixels of the display panel 100 under the control of a timing controller 130. The display panel driver includes the data driver 110 and the gate drivers 121L to 122R. The display panel driver further includes the level shifter 140 connected between the gate drivers 121L to 122R and the timing controller 130. The display panel driver can further include a demultiplexer 112 disposed between the data driver 110 and the data lines 102. The demultiplexer 112 can be omitted.

The demultiplexer 112 sequentially supplies data voltages output from the channels of the data driver 110 to the data lines 102. When the demultiplexer 112 is disposed between the output terminals of the data driver 110 and the data lines 102, the number of channels of the data driver 110 can be reduced.

Figure 3:
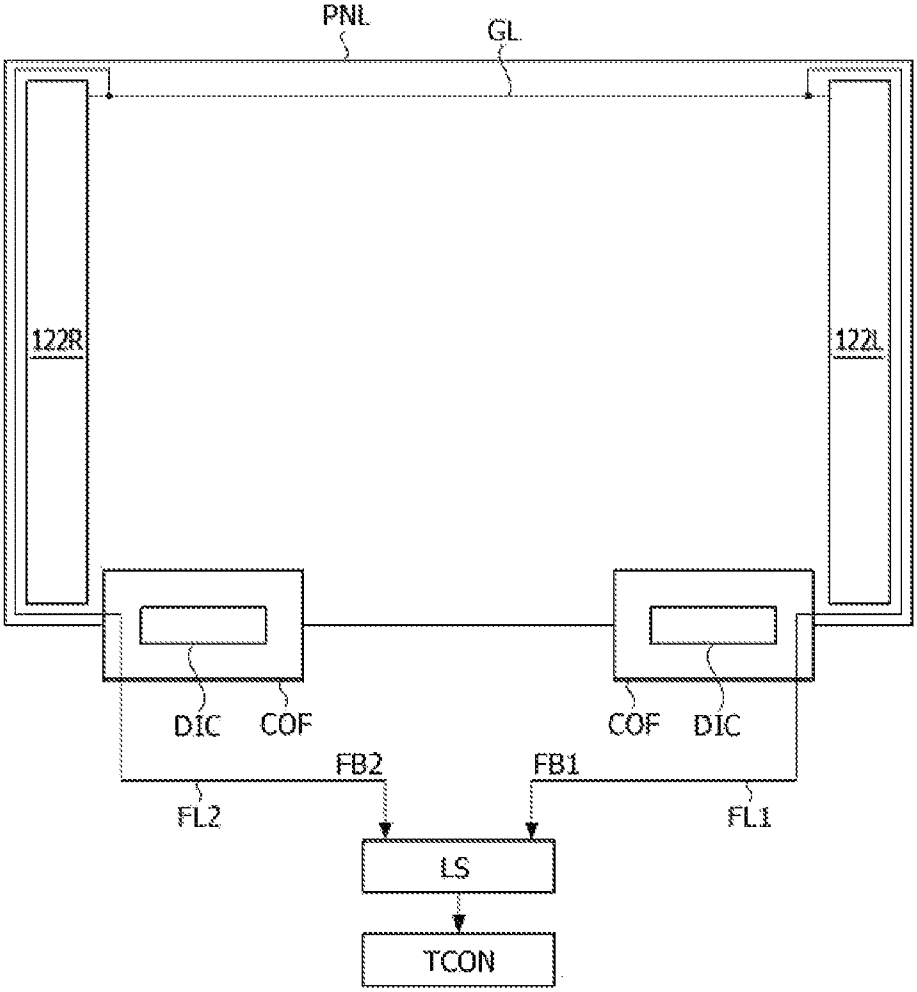
FIG. 3 is a diagram showing a transmission path of a feedback signal according to one embodiment of the present disclosure.
Figure 5:
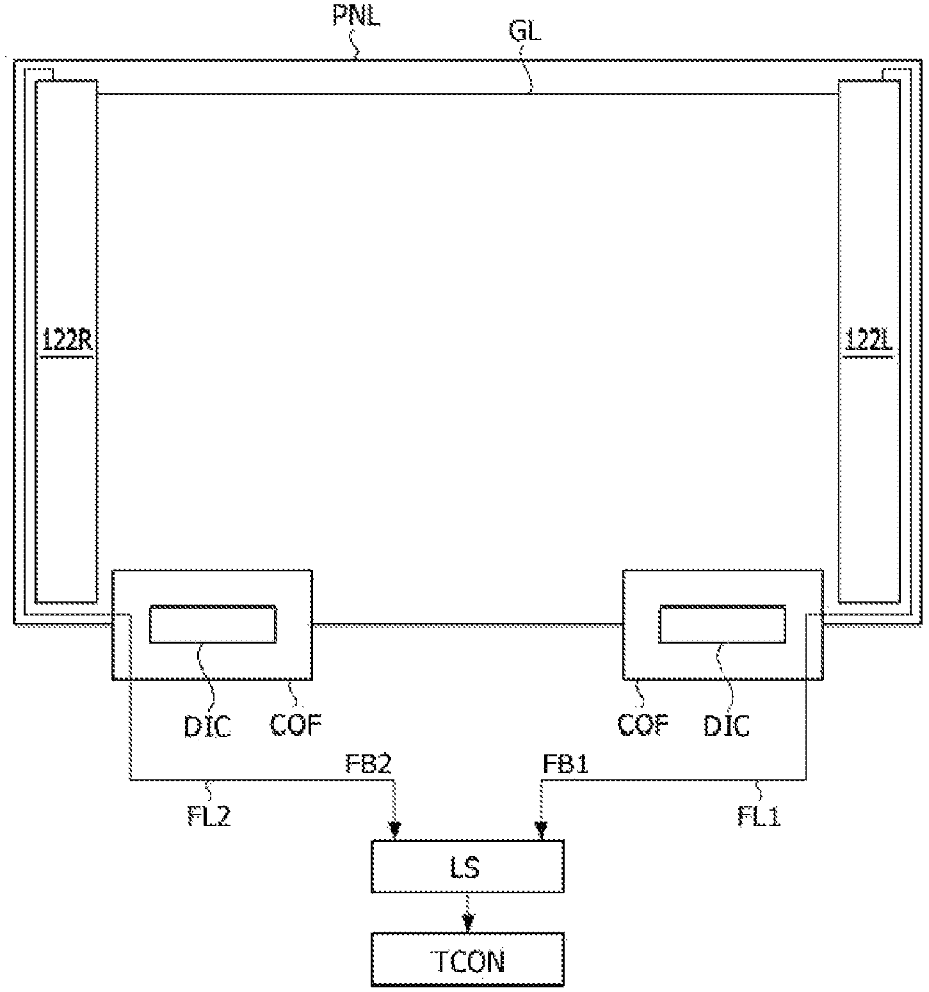
FIG. 5 is a diagram showing a transmission path of a feedback signal according to another embodiment of the present disclosure.

The display panel driver can further include a touch sensor driver for driving touch sensors. The data driver 110 and the touch sensor driver can be integrated into one drive integrated circuit (IC) as shown in FIGS. 3 and 5. In a mobile device or a wearable device, the timing controller 130, the level shifter 140, the power supply 150, the data driver 110, and the like can be integrated into one drive IC.

The display panel driver can operate in a low speed driving mode under the control of the timing controller 130. The low-speed driving mode can be set to reduce power consumption of the display device when an input image is not changed by a preset number of frames by analyzing the input image. The low-speed driving mode can reduce power consumption of the display panel driver and the display panel 100 by reducing refresh frames in which pixel data is written in pixels when a still image is displayed for more than a predetermined amount of time. The low-speed driving mode is not limited to instances where a still image is displayed. For example, when the display device is operated in a standby mode or when a user command or an input image is not input to the display panel driving circuit for more than a predetermined time, the display panel driving circuit can be operated in a low speed driving mode.

The data driver 110 receives pixel data DATA of an input image received as a digital signal from the timing controller 130 and outputs a data voltage. The data driver 110 generates a data voltage Vdata to be supplied to the pixels 101 by converting pixel data of an input image into a gamma compensation voltage for each frame period using a digital to analog converter (DAC). The gamma reference voltage VGMA is divided into gamma compensation voltages for each gray scale through a voltage divider circuit. The gamma compensation voltage for each gray scale is provided to the DAC of the data driver 110. The data voltage Vdata is output from each of the channels of the data driver 110 through an output buffer.

The gate drivers 121L to 122R can include one or more shift registers formed on the circuit layer CIR of the display panel 100. The gate drivers 121L to 122R can be disposed on a bezel area BZ, which is a non-display area of the display panel 100, or can be distributed in a pixel array where an input image is reproduced.

The gate drivers 121L to 122R are disposed in the bezel area BZ on both sides of the display panel 100 with the display area of the display panel interposed therebetween, so that gate pulses can be supplied to the gate lines 103 in a double-feeding method. The gate drivers 121L to 122R sequentially output the gate pulses to the gate lines 103 under the control of the timing controller 130. The gate drivers 121L to 122R can sequentially supply the gate pulses to the gate lines 103 by shifting the gate pulses using a shift register. The gate pulse can include a scan pulse and an emission control pulse (hereinafter referred to as "pulse"). Hereinafter, among the gate lines 103, a gate line to which a scan pulse is applied will be referred to as a scan line, and a gate line to which an EM pulse is applied will be referred to as an EM line, respectively.

The gate drivers 121L to 122R include scan drivers 121L and 121R that sequentially output scan pulses using a first shift register and EM drivers 122L and 122R that sequentially output EM pulses using a second shift register.

The scan drivers 121L and 121R include a first scan driver 121L disposed on the left side of the display panel 100 and a second scan driver 121R disposed on the right side of the display panel 100. The first scan driver 121L includes a first-first shift register. The second scan driver 121R includes a first-second shift registers. The first and second scan drivers 121L and 121R can supply scan pulses to the scan lines in a double-feeding manner in response to the clocks GCLK(L) and GCLK(R).

The EM drivers 122L and 122R include a first EM driver 122L disposed on the left side of the display panel 100 and a second EM driver 122R disposed on the right side of the display panel 100. The first EM driver 122L includes a second-first shift register. The second EM driver 122R includes a second-second shift register. The first EM driver 122L and the second EM driver 122R can supply EM pulses to EM lines in a double-feeding method in response to the clocks ECLK(L) and ECLK(R).

Clock lines CL1 and CL2 and feedback lines FL1 and FL2 can be connected to each of the first and EM drivers 121L to 122R. The following embodiments are described mainly on EM drivers, but can also be applied to scan drivers. Hereinafter, the EM driver can be interpreted as a gate driver.

The timing controller 130 receives digital video data DATA of an input image and a timing signal synchronized therewith from the host system. The timing signal can include a vertical sync signal Vsync, a horizontal sync signal Hsync, a main clock and data enable signal DE, and the like. Since a vertical period and a horizontal period can be known by counting the data enable signal DE, the vertical sync signal Vsync and the horizontal sync signal Hsync can be omitted. The data enable signal DE has a period of one horizontal period (1H).

The host system can be any one of a television (TV) system, a tablet computer, a notebook computer, a navigation system, a personal computer (PC), a home theater system, a mobile device, a wearable device, and a vehicle system. The host system can scale an image signal from a video source to fit the resolution of the display panel 100 and transmit the scaled image signal to the timing controller 130 together with a timing signal.

The timing controller 130 can multiply an input frame frequency by i (where, i is a positive integer greater than 0) in the normal driving mode, and control the operation timing of the display panel driver with a frame frequency of the input frame frequency×i Hz (where, i is a natural number). The input frame frequency is 60 Hz in the National Television Standards Committee (NTSC) scheme and 50 Hz in the Phase-Alternating Line (PAL) scheme.

The timing controller 130 can lower the driving frequency of the pixels 101 by reducing the number of refresh frame frequency in which pixel data is written to the pixels in the low-speed driving mode compared to the normal driving mode. For example, the driving frequency of the pixels 101 in the normal driving mode can be a frame frequency greater than or equal to 60 Hz, for example, any one of 60 Hz, 120 Hz, and 144 Hz. The driving frequency of the pixels in the low-speed driving mode can be lower than that of the normal driving mode, for example, a frame frequency between 1 Hz and 30 Hz, or less than 60 Hz. The timing controller 130 can lower the driving frequency of the display panel driver by lowering the frame frequency to a frequency between 1 Hz and 30 Hz in the low-speed driving mode.

The timing controller 130 generates a data timing control signal for controlling the operation timing of the data driver 110, a control signal for controlling the operation timing of the demultiplexer 112, and a gate timing control signal for controlling the operation timing of the gate drivers 121L to 122R, based on the timing signals Vsync, Hsync, and DE received from the host system. The timing controller 130 controls the operation timing of the display panel driver to synchronize the data driver 110, the demultiplexer 112, the touch sensor driver, and the gate driver 121L to 122R.

The voltage of the signal output from the timing controller 130 is a digital logic voltage, and the driving voltage of the gate drivers 121L to 122R has a higher voltage level than the digital logic voltage, for example, a gate-off voltage and a gate-on voltage VGH and VGL.

The timing controller 130 compares the feedback signals received through the feedback lines FL1 and FL2 with a previously stored normal feedback pattern to determine whether the gate drivers 121L to 122R are still operating normally. When the feedback signal pattern is determined to be abnormal, the timing controller 130 can drive the gate lines with only one gate driver that is still operating normally among gate drivers 121L to 122R. The timing controller 130 can stop an output of the abnormal gate driver by direct-currentizing a clock input to the abnormal gate driver that generates an abnormal output.

The output of the abnormal gate driver can be stopped and the gate pulse can be single-fed to the gate line by using only the gate driver that is still operating normally. When a gate pulse is single-fed to a corresponding gate line 103, a DC voltage can be applied to one CLK node of gate drivers disposed on both sides of the display panel under the control of the timing controller 130. The gate driver and the pixel circuit include a switch element controlled by a gate pulse. The switch element is turned on depending on the gate-on voltage VGL of the gate pulse and turned off depending on the gate-off voltage VGH.

When the gate drivers 121L and 122L disposed on the left side of the display panel 100 and the gate drivers 121R and 122R disposed on the right side of the display panel 100 simultaneously generate abnormal outputs, the timing controller 130 can apply a disable signal to the power supply 150 to enter a power off mode of the display panel, and then apply an enable signal to the power supply 150 to restart the display panel driver. In this situation, the outputs of the gate drivers 121L to 122R are temporarily stopped, and then restarted (e.g., the device can be automatically rebooted or reset, in order to cure an abnormal operation situation).

The level shifter 140 can receive the gate timing control signal received from the timing controller 130, generate clocks GCLK and ECLK, and provide the generated clocks to the gate drivers 121L to 122R. The level shifter 140 increases the swing width of the input signal received from the timing controller 130 and outputs it to the gate drivers 121L to 122R. Further, the level shifter 140 reduces the swing width of the feedback signals FB1 and FB2 received from the feedback lines FL1 and FL2 to a swing width of the digital logic voltage and outputs the reduced swing width to the timing controller 130.

When the gate timing signal generated from the timing controller 130 is a direct-currentized signal, the level shifter 140 does not supply clocks to the clock lines connected to the gate drivers 121L to 122R and continuously applies a gate-off voltage, for example, a gate-off voltage VGH. In this situation, the abnormal gate driver does not generate an output because the transistors of the buffer remain in an off-state (or floating state).

Since the EM pulse controls the switch element that turns on/off a current path flowing from the pixel circuit to the light emitting element, even when the EM pulse is supplied to the EM gate line from either the first EM driver 122L or the second EM driver 122R, it hardly affects the image reproduced on the display panel 100.

When both of the EM drivers 122L and 122R disposed on both sides of the display panel are operating normally, the timing controller 130 controls the EM drivers 122L and 122R on both sides such that the EM pulses are simultaneously double-fed to both ends of the EM lines. When one EM driver 122L or 122R generates an abnormal EM pulse, the timing controller 130 controls the EM drivers 122L and 122R such that the EM pulses output from the other EM driver 122R or 122L that is still outputting the normal EM pulses can be single-fed to the first ends of the EM lines. For example, the device can provide redundancy or a type of fail-over function, in the situation where one of the gate drivers starts to operate abnormally.

FIG. 3 is a diagram showing a transmission path of a feedback signal according to one embodiment of the present disclosure. In FIG. 3, a chip on film COF can include a drive IC DIC in which the data driver 110 is embedded and can be attached to the display panel PNL. In FIG. 3, "LS" is the level shifter 140 and "TCON" is the timing controller 130.

Referring to FIG. 3, the first EM driver 122L is connected to first ends of the EM lines GL and sequentially supplies EM pulses to the EM lines GL. The second EM driver 122R is connected to second ends of the EM lines GL and sequentially supplies EM pulses to the EM lines GL. When the first EM driver 122L and the second EM 122R are normally driven, the EM pulses are simultaneously double-fed from both ends of the EM line GL.

The first feedback line FL1 can be connected between a last output node of the first EM driver 122L and a first feedback input node of the level shifter LS. The last output node can be an output node of a last signal transfer part generating the last pulse applied to the last EM line GL in the scanning sequence of one frame period. The last output node of the first EM driver 122L can be connected to the first end of the last EM line GL. A first feedback signal FB1 output from the first EM driver 122L can be transmitted to the feedback input node of the timing controller TCON through the first feedback line FL1 and the level shifter LS.

A second feedback line FL2 can be connected between the last output node of the second EM driver 122R and the second feedback input node of the level shifter LS. The last output node of the second EM driver 122R can be connected to the second end of the last EM line GL. The second feedback signal FB2 output from the second EM driver 122R can be transmitted to the feedback input node of the timing controller TCON through the second feedback line FL2 and the level shifter LS. The first and second feedback signals FB1 and FB2 can include pulses synchronized with the EM pulses output from the EM drivers 122L and 122R.

Figure 4:
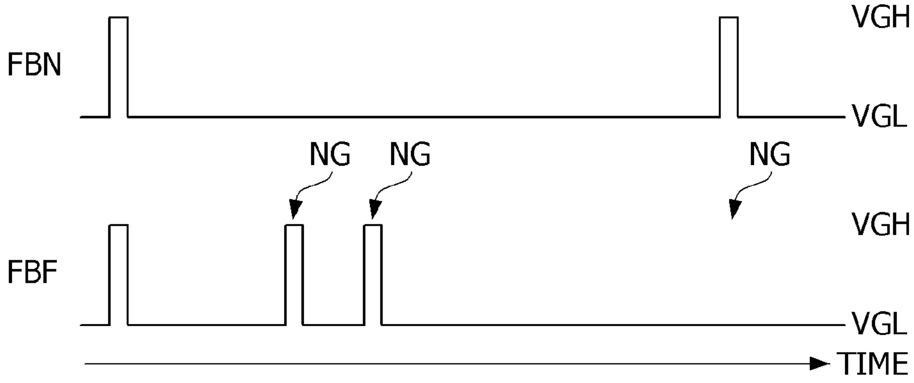
FIG. 4 is a waveform diagram showing an example of a normal pattern and an abnormal pattern of a feedback signal according to an embodiment of the present disclosure.

The level shifter LS can provide the first and second feedback signals FB1 and FB2 to the timing controller TCON through one feedback output node. The timing controller TCON can compare the feedback signals FB1 and FB2 received at the feedback input node with a previously stored normal feedback pattern, and thus determine which of the abnormal EM drivers 122L and 122R outputs the abnormal EM pulse. In FIG. 4, "FBN" is one example of a normal pattern of the feedback signal FB generated when a normal EM pulse is output (e.g., feedback normal), and "FBF" is one example of an abnormal pattern of the feedback signal FB generated when an abnormal EM pulse is output (e.g., feedback failure). "NG" represents a defective position of the feedback signals FB1 and FB2 (e.g., not good). In FIG. 4, "VGH" is a gate-off voltage and "VGL" is a gate-on voltage.

FIG. 5 is a diagram showing a transmission path of a feedback signal according to one embodiment of the present disclosure.

Referring to FIG. 5, the first feedback line FL1 can be connected between the last output node of the first EM driver 122L and the first feedback input node of the level shifter LS. The first feedback signal FB2 output from the first EM driver 122L can be transmitted to the first feedback input node of the timing controller TCON through the first feedback line FL1 and the level shifter LS.

The second feedback line FL2 can be connected between the last output node of the second EM driver 122R and the second feedback input node of the level shifter LS. The second feedback signal FB2 output from the second EM driver 122R can be transmitted to the second feedback input node of the timing controller TCON through the second feedback line FL2 and the level shifter LS. The first and second feedback signals FB1 and FB2 can include pulses synchronized with the EM pulses output from the EM drivers 122L and 122R.

The first and second feedback lines FL1 and FL2 can be connected to the second output node of the EM driver 122L and 122R separated from the EM line GL. Therefore, in FIG. 5, the first and second feedback lines FL1 and FL2 can be electrically separated from the EM line GL.

The level shifter LS can provide the first feedback signal FB1 to the timing controller TCON through the first feedback output node. The level shifter LS can provide the second feedback signal FB2 to the timing controller TCON through the second feedback output node.

The timing controller TCON can compare the feedback signals FB1 and FB2 received at the first and second feedback input nodes with a previously stored normal feedback pattern, and thus determine which of the EM drivers 122L and 122R outputs the abnormal EM pulse when the feedback signals FB1 and FB2 are different from the normal feedback pattern.

Figure 6A:
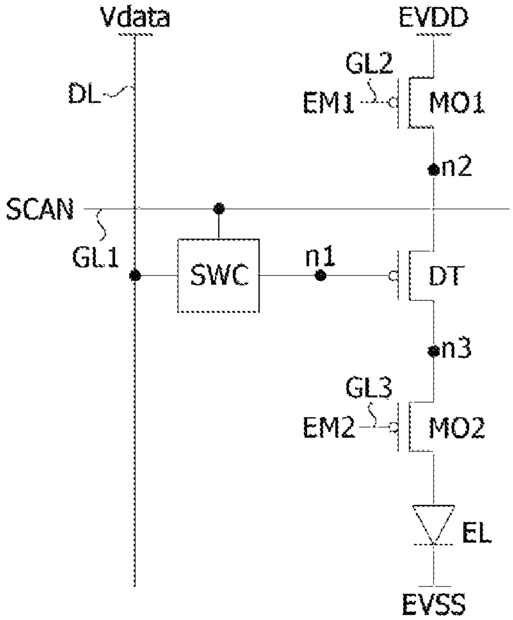
FIG. 6A to 6C are circuit diagrams showing a pixel circuit according to embodiments of the present disclosure.
Figure 6B:
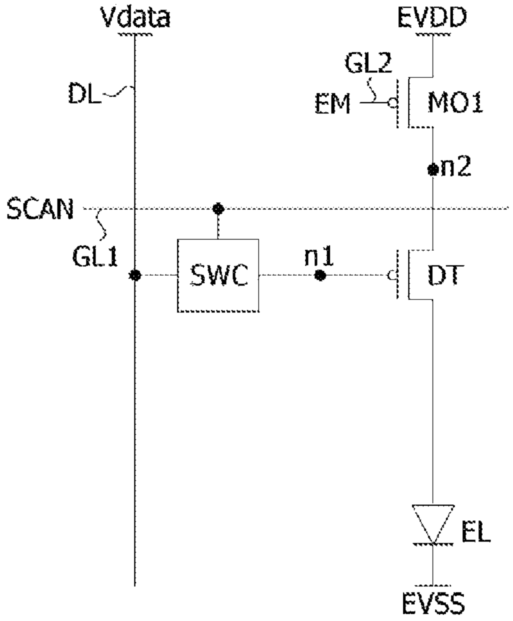
Figure 6C:
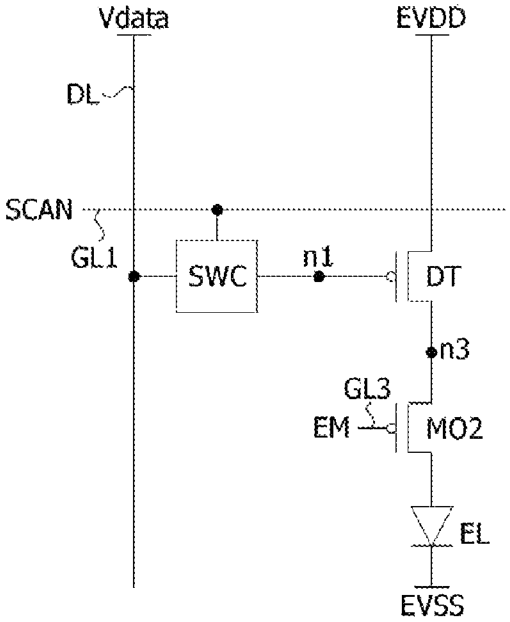

FIGS. 6A to 6C are circuit diagrams showing a pixel circuit according to an embodiment of the present disclosure.

Referring to FIGS. 6A to 6C, the pixel circuit disposed in each of the sub-pixels includes a light emitting element EL, a driving element DT supplying current to the light emitting element EL, a scan switch circuit SWC supplying the signal Vdata to the gate electrode of the driving element DT in response to a scan pulse, and one or more EM switch elements M01 and M02 connecting a current path between the pixel driving voltage ELVDD and the cathode voltage ELVSS in response to the EM pulse.

The pixel driving voltage EVDD and the cathode voltage EVSS can be constant voltages. The pixel driving voltage EVDD is higher than the cathode voltage EVSS.

The driving element DT drives the light emitting element EL by supplying a current to the light emitting element EL depending on a gate-source voltage Vgs. The driving element DT includes a gate electrode connected to the scan switch circuit SWC through a first node n1, a first electrode connected to a second node n2 to which the pixel driving voltage EVDD is applied, and a second electrode connected to a third node n3 connected to the light emitting element EL.

The scan switch circuit SWC can include one or more switch elements and a capacitor storing a gate-to-source voltage of the driving element DT. The driving element and the switch element of the scan switch circuit SWC can be implemented with TFTs. The scan switch circuit SWC can be turned on depending on the gate-on voltage of the scan pulse SCAN to transfer a data signal Vdata to the gate electrode of the driving element DT. When the switch element of the scan switch circuit SWC is a p-channel TFT, the gate-on voltage can be the gate-on voltage VGL. The scan switch circuit SWC can include an internal compensation circuit that samples a threshold voltage of the driving element DT and compensates for the gate voltage of the driving element DT by the threshold voltage. The scan switch circuit SWC can be implemented with any known scan switch circuit.

The light emitting element EL is turned on and emits light when a forward voltage between an anode electrode and a cathode electrode is greater than or equal to a threshold voltage. A cathode voltage EVSS lower than the pixel driving voltage EVDD is applied to the cathode electrode of the light emitting element EL. The light emitting element EL can be implemented with an OLED including an organic compound layer formed between the anode and the cathode. The organic compound layer can include a hole injection layer (HIL), a hole transport layer (HTL), an emission layer (EML), an electron transport layer (ETL), and an electron injection layer, (EIL), but is not limited thereto. When a voltage is applied to the anode and cathode electrodes of the OLED, holes passed through the hole transport layer (HTL) and electrons passed through the electron transport layer (ETL) can be moved to the light emitting layer (EML) to form excitons and emit visible light from the light emitting layer (EML). The OLED used as a light emitting element can have a tandem structure in which a plurality of light emitting layers are stacked. The OLEDs with a tandem structure can improve the luminance and lifetime of pixels.

An internal compensation circuit can be included in the pixel circuit or an external compensation circuit can be connected to the pixel circuit. The external compensation circuit can compensate for electrical characteristics of the driving element, for example, a threshold voltage and/or mobility in real time by modulating pixel data (digital data) of the input image based on a result of sensing a current or voltage flowing in the third node n3 between the driving element DT and the light emitting element EL.

The first and second EM switch elements M01 and M02 are examples implemented with p-channel TFTs in FIGS. 6A to 6C, but are not limited thereto. The first EM switch element M01 is turned on depending on the gate-on voltage of the EM pulse EM1 to supply the pixel driving voltage EVDD to the second node n2. The first EM switch element M01 includes a gate electrode to which the EM pulse EM1 is applied, a first electrode to which the pixel driving voltage EVDD is applied, and a second electrode connected to the second node n2.

The second EM switch element M02 is turned on depending on the gate-on voltage of the EM pulse EM2 and connects the third node n3 to the anode electrode of the light emitting element EL to switch a current path between the light emitting elements EL of the driving element DT. The second EM switch element M02 includes a gate electrode to which the EM pulse EM2 is applied, a first electrode connected to the third node n3, and a second electrode to which the cathode voltage EVSS is applied.

The pixel circuit can include the first and second EM switch elements M01 and M02 or can include any one of the first and second EM switch elements M01 and M02.

Figure 7:
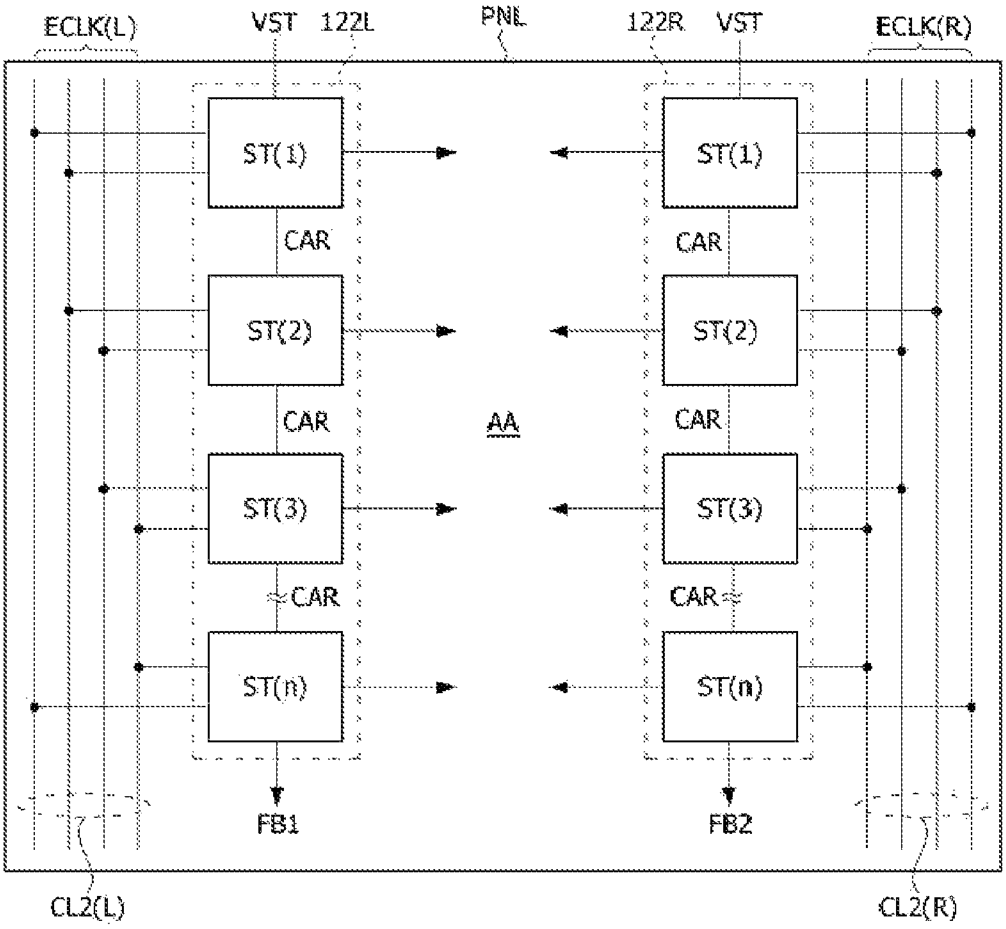
FIG. 7 is a diagram showing in detail, clock lines connected to EM drivers according to one embodiment of the present disclosure.
Figure 8:
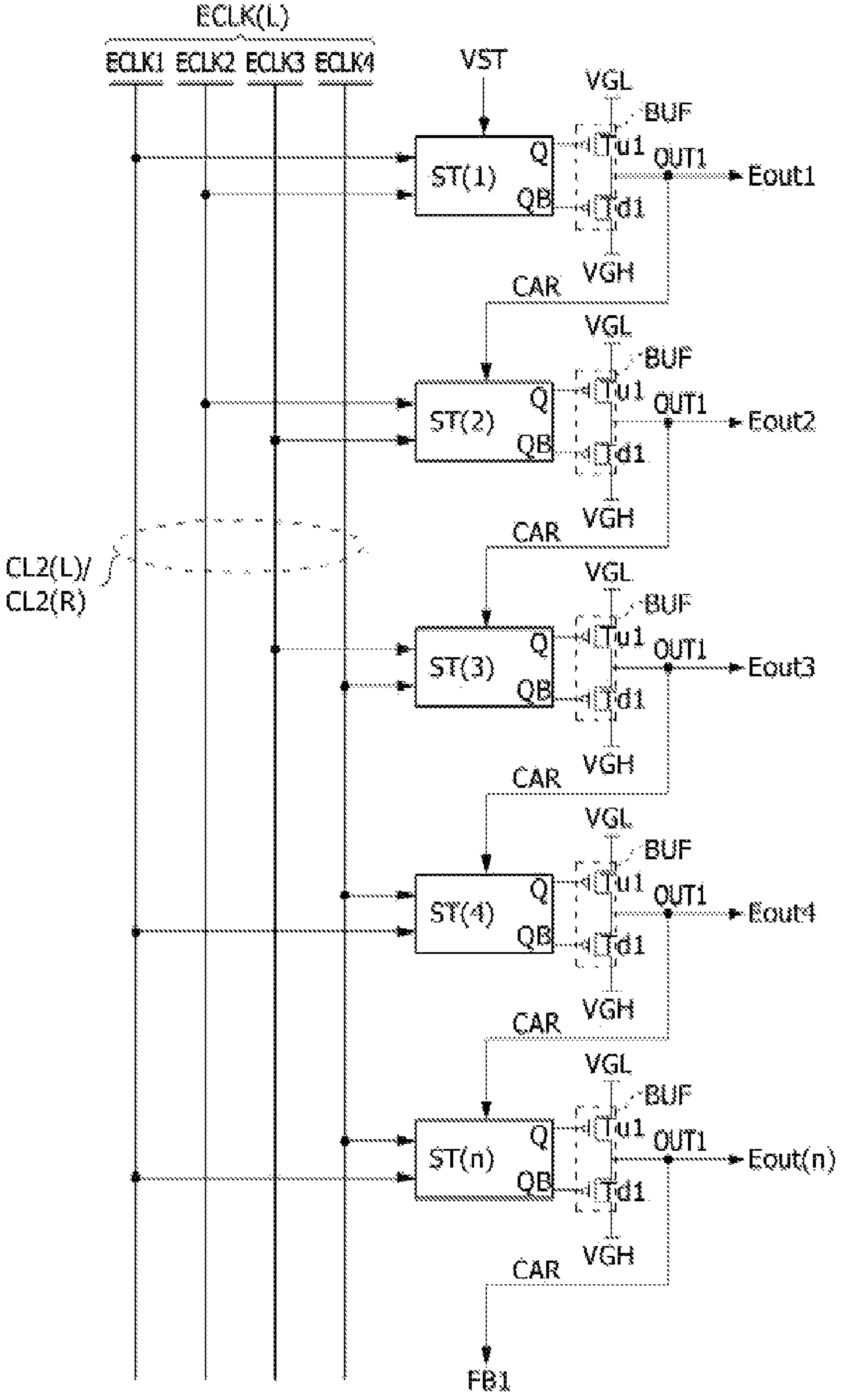
FIG. 8 is a circuit diagram showing a buffer connected to an output terminal of the EM driver according to one embodiment of the present disclosure.
Figure 9:
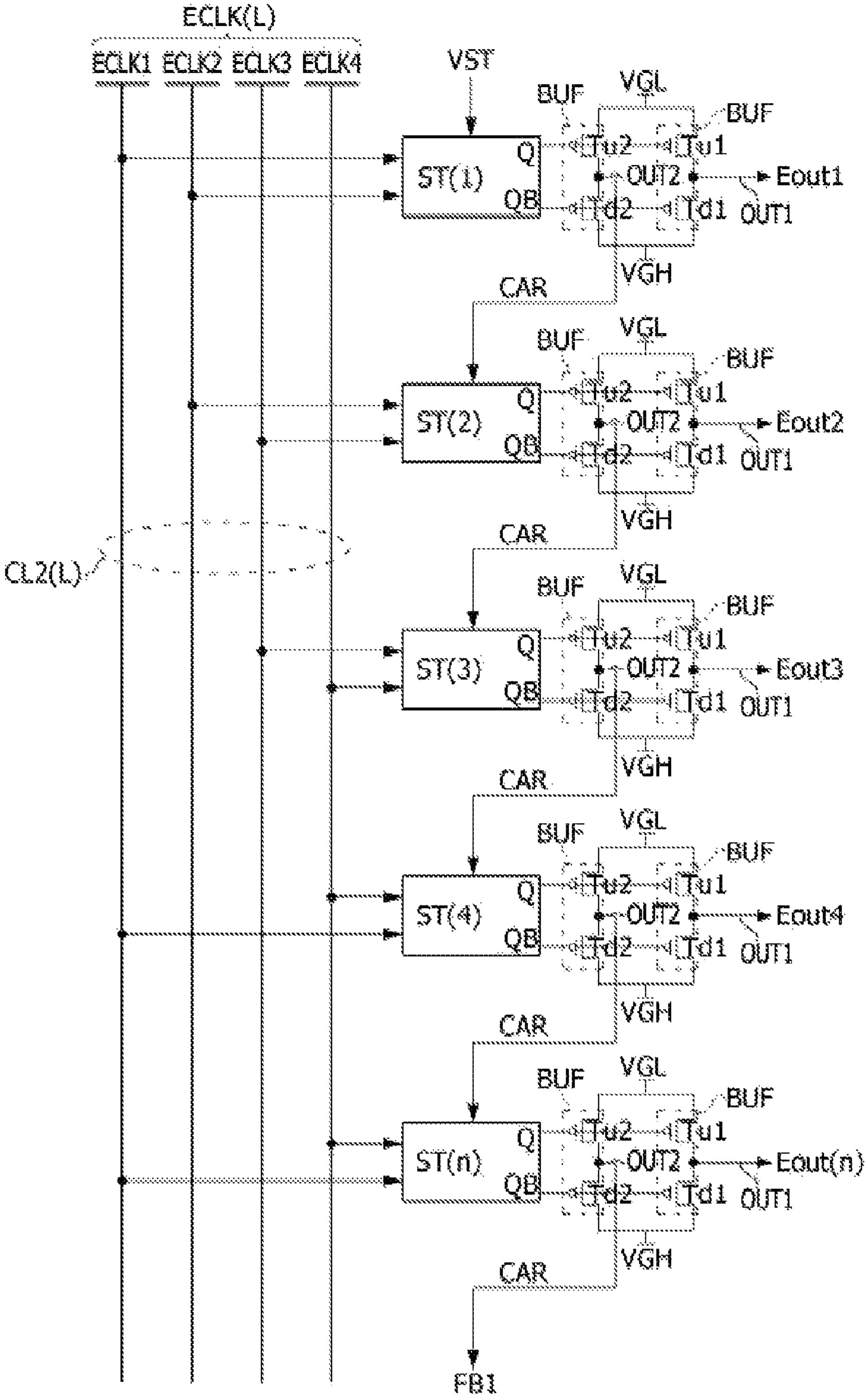
FIG. 9 is a circuit diagram showing first and second buffers connected to an output terminal of an EM driver according to one embodiment of the present disclosure.

FIG. 7 is a diagram showing in detail clock lines connected to the first EM driver and the second EM driver. FIG. 8 is a circuit diagram showing a buffer connected to an output terminal of a first EM driver. FIG. 9 is a circuit diagram showing first and second buffers connected to the output terminal of the first EM driver. The buffer connected to the output terminal of the second EM driver is substantially the same as the circuit configuration of FIGS. 8 and 9, so it is omitted from the drawings.

Figure 11:
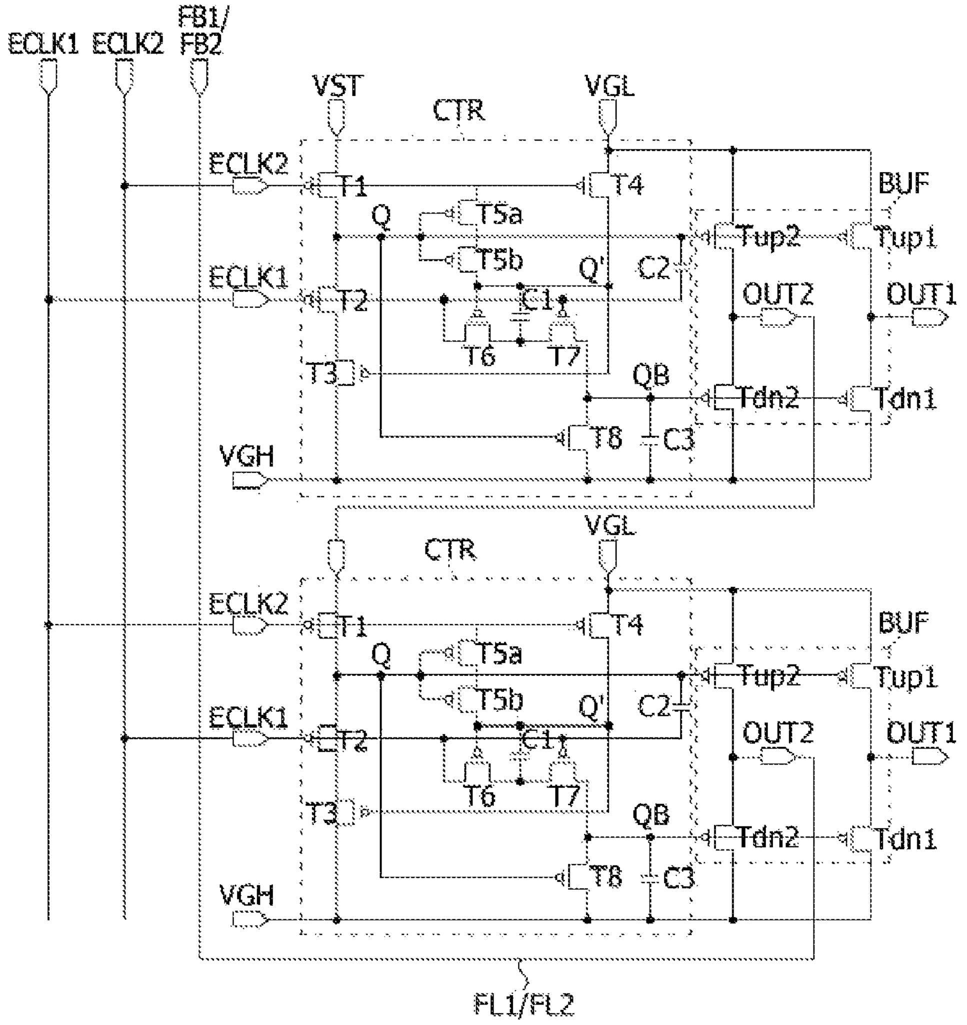
Figure 12:
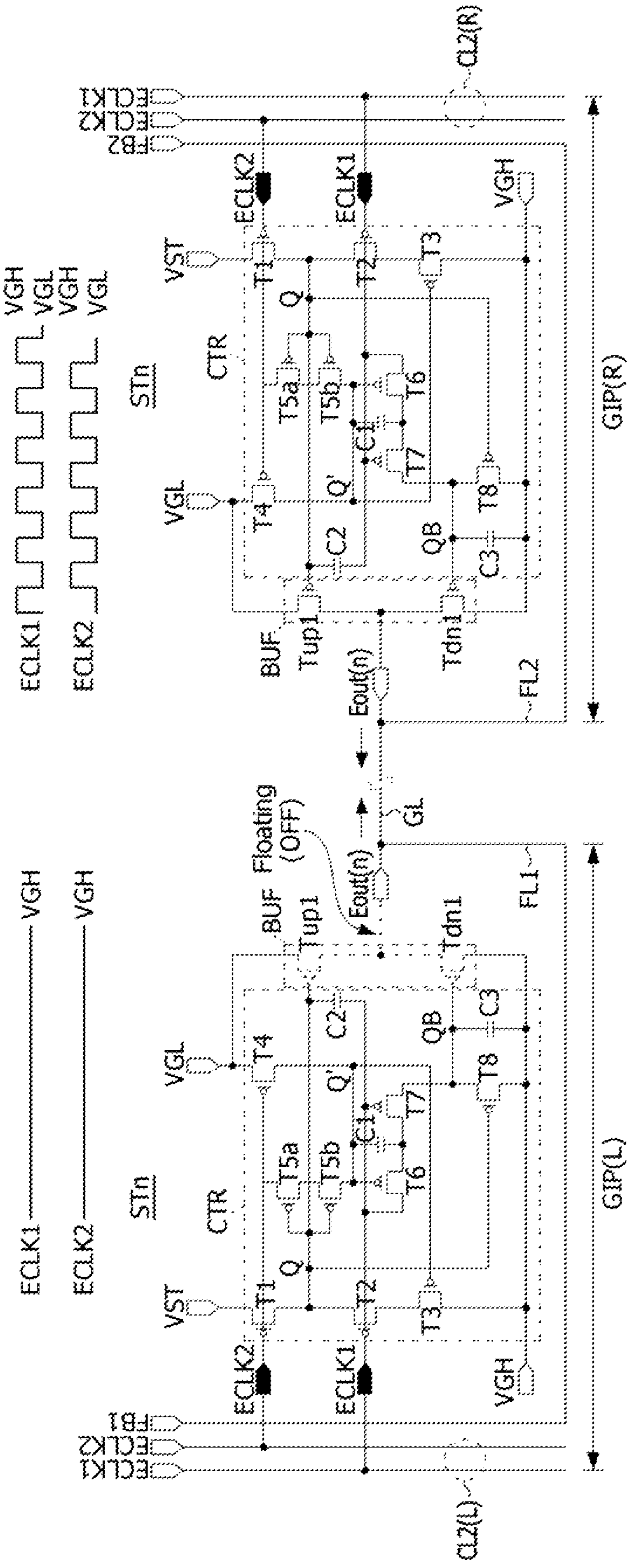
FIG. 12 is a diagram showing an example of single-feeding an EM line by controlling a clock input to EM drivers.

Referring to FIG. 7, the first EM driver 122L includes a shift register that sequentially outputs EM pulses in synchronization with a first shift clock ECLK(L). The second EM driver 122R includes a shift register that sequentially outputs EM pulses in synchronization with the second shift clock ECLK(R). Each of the shift registers of the EM drivers 122L and 122R includes signal transfer parts ST1 to ST(n) connected in a cascade structure to sequentially generate outputs, that is, EM pulses Eout1 to Eout(n). Here, n is a positive integer greater than or equal to 2. The shift clocks ECLK(L) and ECLK(R) can be j-phase clocks (where, j is a positive integer greater than or equal to 2) whose phases are sequentially shifted. In FIGS. 7 to 9, the shift clocks ECLK(L) and ECLK(R) are exemplified as 4-phase clocks ECLK1 to ECLK4, but are not limited thereto. For example, the shift clocks ECLK(L) and ECLK(R) can be 2-phase clocks as shown in FIGS. 11 and 12. The 2-phase clocks can include a first clock ECLK1 and a second clock ECLK2 generated with an inverted phase of the first clock ECLK1.

Each of the signal transfer parts ST1 to STn includes a VST node to which a start signal VST or a carry pulse CAR from a previous signal transfer part is input, CLK nodes to which clocks ECLK1 to ECLK4 are input, first and second control nodes Q and QB that are charged and discharged by a signal generation circuit to drive the transistors of the buffer BUF, an output node from which the EM pulse is output, and the like.

The start signal VST is input to the VST node of the first signal transfer part ST1. The start signal VST can be synchronized with a first pulse of the first clock ECLK1. The carry signal CAR output from the previous signal transfer part is input to the VST node of the signal transfer parts ST2 to STn that are connected in cascade to the first signal transfer part ST1.

First to n−1th signal transfer parts ST1 to STn−1 can output an EM pulse through a first output node OUT1 and simultaneously output the second output the carry pulse CAR through a second node OUT2, as shown in FIGS. 7 to 9. In FIGS. 7 to 9, “Eout1 to Eout(n)” represent EM pulses supplied to the EM line GL of the display panel. The n-th signal transfer part STn, which is the last signal transfer part, outputs the n-th EM pulse Eout(n) and at the same time outputs the feedback signals FB1 and FB2.

Referring to FIG. 8, each of the signal transfer parts ST1 to STn includes a buffer BUF connected to the first output node OUT1. The buffer BUF includes a first pull-up transistor Tu1 controlled depending on the voltage of the first control node Q and a first pull-down transistor Td1 controlled depending on the voltage of the second control node QB.

The first pull-up transistor Tu1 is turned on depending on the voltage of the first control node Q to charge the voltage of the first output node OUT1 to the gate-on voltage VGL. The first pull-up transistor Tu1 includes a gate electrode connected to the first control node Q, a first electrode to which the gate-on voltage VGL is applied, and a second electrode connected to the first output node OUT1.

The first pull-down transistor Td1 is turned on depending on the voltage of the second control node QB to supply the gate-off voltage VGH to the first output node OUT1. The first pull-down transistor Td1 includes a gate electrode connected to the second control node QB, a first electrode connected to the first output node OUT1, and a second electrode to which the gate-off voltage VGH is applied.

The EM pulses Eout1 to Eout(n) are output through the first output node OUT1 and the carry signal CAR is output at the same time. The first output node OUT1 of the n-th signal transfer part STn is connected to the feedback lines FL1 and FL2. The carry signal output from the nth signal transfer part STn is transmitted to the timing controller TCON as feedback signals FB1 and FB2. Since the first output node OUT1 is connected to the EM line GL of the display panel, the first feedback line FB1 connected to the first EM driver 122L and the second feedback line FB2 connected to the second EM driver 122R can be shorted through the EM line GL. In this situation, the first feedback signal FB1 and the second feedback signal FB2 can be transmitted to the timing controller TCON with the same signal pattern.

Referring to FIG. 9, each of the signal transfer parts ST1 to STn includes a first buffer connected to the first output node OUT1 and a second buffer connected to the second output node OUT2. The first buffer includes a first pull-up transistor Tu1 controlled depending on the voltage of the first control node Q and a first pull-down transistor Td1 controlled depending on the voltage of the first control node Q. The first buffer outputs EM pulses Eout1 to Eout(n) through the first output node OUT1. The second buffer includes a second pull-up transistor Tu2 controlled depending on the voltage of the first control node Q and a second pull-down transistor Td2 controlled depending on the voltage of the second control node QB. The second buffer outputs the carry signal CAR or the feedback signals FB1 and FB2 through the second output node OUT2.

The first pull-up transistor Tu1 is turned on depending on the voltage of the first control node Q to charge the voltage of the first output node OUT1 to the gate-on voltage VGL. The first pull-up transistor Tu1 includes a gate electrode connected to the first control node Q, a first electrode to which the gate-on voltage VGL is applied, and a second electrode connected to the first output node OUT1.

The first pull-down transistor Td1 is turned on depending on the voltage of the second control node QB to supply the gate-off voltage VGH to the first output node OUT1. The first pull-down transistor Td1 includes a gate electrode connected to the second control node QB, a first electrode connected to the first output node OUT1, and a second electrode to which the gate-off voltage VGH is applied.

The second pull-up transistor Tu2 is turned on depending on the voltage of the first control node Q to charge the voltage of the second output node OUT2 to the gate-on voltage VGL. The second pull-up transistor Tu2 includes a gate electrode connected to the first control node Q, a first electrode to which the gate-on voltage VGL is applied, and a second electrode connected to the second output node OUT2.

The second pull-down transistor Td1 is turned on depending on the voltage of the second control node QB to supply the gate-off voltage VGH to the second output node OUT2. The second pull-down transistor Td2 includes a gate electrode connected to the second control node QB, a first electrode connected to the second output node OUT2, and a second electrode to which the gate-off voltage VGH is applied.

The EM pulses Eout1 to Eout(n) are output through the first output node OUT1 from each of the signal transfer parts ST1 to STn, and the carry signal CAR or the feedback signals FB1 and FB2 is output through the second output node OUT1. The second output node OUT2 of the n-th signal transfer part STn is connected to the feedback lines FL1 and FL2. The carry signal output from the nth signal transfer part STn is transmitted to the timing controller TCON as feedback signals FB1 and FB2. Since the second output node OUT2 is separated from the EM line GL of the display panel, the first feedback line FB1 connected to the first EM driver 122L and the second feedback line FB2 connected to the second EM driver 122R are electrically isolated. In this situation, the signal patterns of the first feedback signal FB1 and the second feedback signal FB2 can be different depending on whether the EM drivers 122L and 122R are operating normally or not. The timing controller TCON compares each of the first feedback signal FB1 and the second feedback signal FB2 with a normal pattern to individually determine whether the first EM driver 122L and the second EM driver 122R are operating normally.

The signal transfer part of each of the EM drivers 122L and 122R includes a control signal generation circuit. The control signal generation circuit can be implemented with a pass-gate circuit or an edge trigger circuit.

Figure 10:
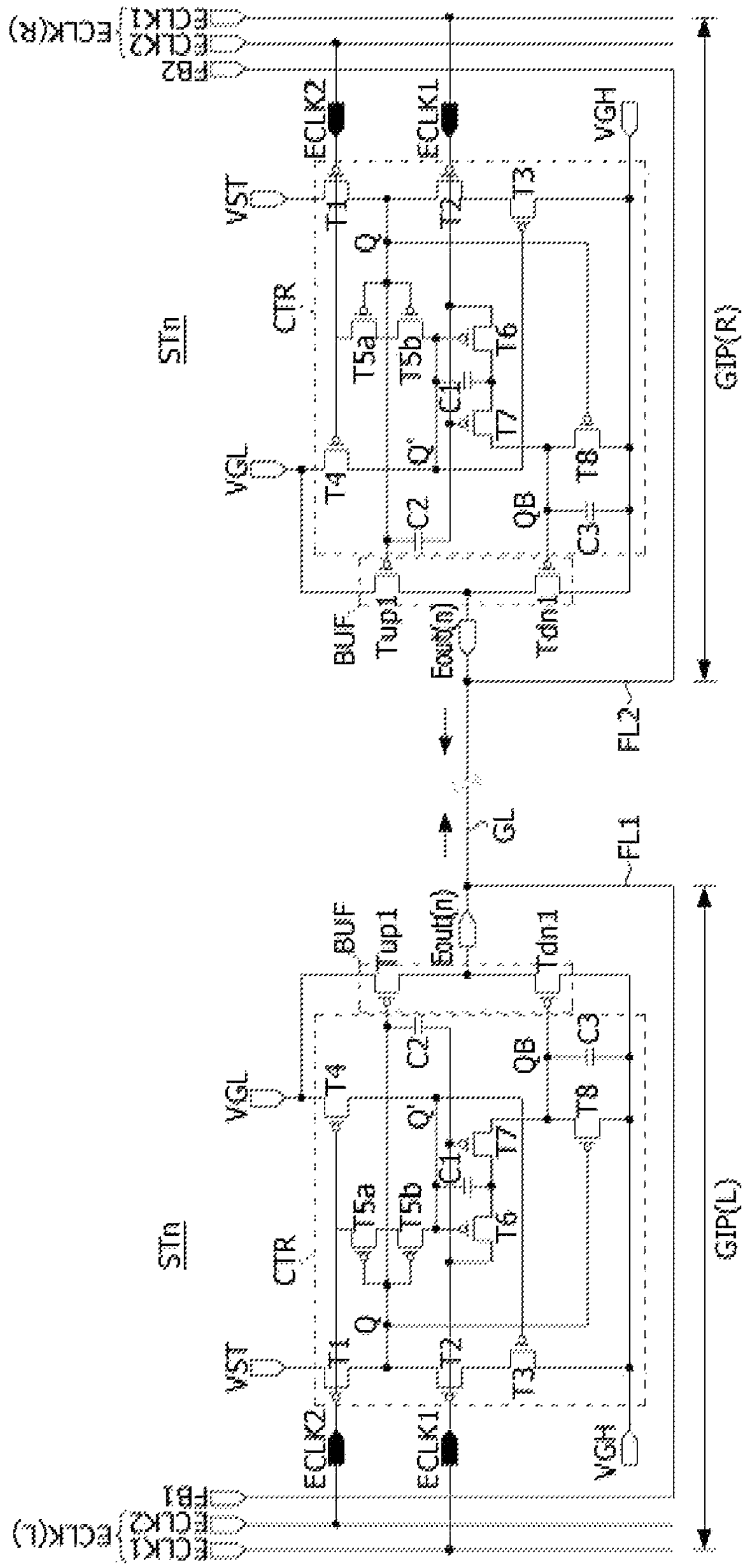
FIGS. 10 and 11 are circuit diagrams showing a control signal generation circuit of an EM driver according to one embodiment of the present disclosure.

In the situation of the pass gate circuit, the clock ECLK is input to the pull-up transistors Tup1 and Tup2. In the pass gate circuit, the control signal generation circuit charges the first control node Q with the voltage of the signal input to the VST node. In contrast, the gate-on voltage VGL is supplied to the pull-up transistors Tup1 and Tup2 of the edge trigger circuit, and the start signal VST and the clock ECLK are input to the control signal generation circuit. Since the voltage of the output node is changed with the voltage of the VST node in synchronization with the edge of the clock ECLK, the edge trigger circuit can generate an output signal with the same waveform as the phase of the signal input to the VST node. The waveform of the output signal can also be changed depending on the waveform of a signal input to the VST node, that is, a start signal or a carry signal. FIG. 10 shows one example of an edge-triggered control signal generation circuit.

FIG. 10 is a circuit diagram showing a control signal generation circuit of the EM driver according to one embodiment of the present disclosure. The feedback line shown in FIG. 10 is an example connected to the first output node OUT1 of the signal transfer part CTR as shown in FIG. 8. The circuit of the signal transfer part CTR is not limited to FIG. 10. In FIG. 10, “GIP(L)” represents the first EM driver 122L, and “GIP(R)” represents the second EM driver 122R.

Referring to FIG. 10, each of the signal transfer parts ST1 to STn of the EM drivers GIP(L) and GIP(R) includes a control signal generation circuit CTR that receive the clocks ECLK(L) and ECLK(R) to charge and discharge the first and second control nodes Q and QB.

The control signal generation circuit CTR includes a plurality of transistors T1 to T8. In the example of FIG. 10, the transistors can be implemented as p-type transistors, but are not limited thereto. The transistors T1 to T8 can be used as switch elements that are turned on depending on the gate-on voltage VGL and turned off depending on the gate-off voltage VGH.

The first transistor T1 is turned on when the gate-on voltage VGL of the second clock ECLK2 is applied, and connects the VST node to the first control node Q to reduce the voltage of the first control node Q to the gate-on voltage VGL. The first transistor T1 is connected to a gate electrode connected to a second CLK node to which the second clock ECLK2 is input, a first electrode connected to a VST node, and a first control node Q.

The second transistor T2 is turned on when the gate-on voltage VGL of the first clock ECLK2 is applied to connect the first control node Q to the first electrode of the third transistor T3. The second transistor T2 includes a gate electrode connected to the first CLK node to which the first clock ECLK1 is input, a first electrode connected to the first control node Q, and a second electrode connected to the first electrode of the third transistor T3.

The third transistor T3 is turned on when the voltage of the buffer node Q' is the gate-on voltage VGL to increase the first control node Q to the gate-off voltage VGH. The third transistor T3 includes a gate electrode connected to the buffer node Q', a first electrode connected to the second electrode of the second transistor T2, and a second electrode connected to the VGH node to which the gate-off voltage VGH is applied.

The fourth transistor T4 is turned on when the voltage of the second clock ECLK2 is the gate-on voltage VGL to supply the gate-on voltage VGL to the buffer node Q'. The fourth transistor T4 includes a gate electrode connected to the second CLK node, a first electrode connected to the VGL node to which the gate-on voltage VGL is applied, and a second electrode connected to the buffer node Q'.

The fifth-a and fifth-b transistors T5*a* and T5*b* are turned on to connect the second CLK node to the buffer node Q' when the voltage of the first control node Q is the gate-on voltage VGL. The fifth-a transistor T5*a* includes a gate electrode connected to the first control node Q, a first electrode connected to the second CLK node, and a second electrode connected to the first electrode of the fifth-b transistor T5*b*. The fifth-b transistor T5*b* includes a gate electrode connected to the first control node Q, a first electrode connected to the second electrode of the fifth-a transistor T5*a*, and a second electrode connected to the buffer node Q'.

The sixth transistor T6 is turned on when the voltage of the buffer node Q' is the gate-on voltage VGL to connect the first CLK node to the first electrode of the seventh transistor T7. The sixth transistor T6 includes a gate electrode connected to the buffer node Q', a first electrode connected to the first CLK node, and a second electrode connected to the first electrode of the seventh transistor T7.

The seventh transistor T7 is turned on when the voltage of the first CLK node is the gate-on voltage VGL, and connects the second electrode of the sixth transistor T6 to the second control node QB to supply the voltage of the second CLK node to the second control node QB. The seventh transistor T7 includes a gate electrode connected to the first CLK node, a first electrode connected to the second electrode of the sixth transistor T6, and a second electrode connected to the second control node QB.

The eighth transistor T8 is turned on when the voltage of the first control node QB is the gate-on voltage VGL, and connects the VGH node to the second control node QB to increase the voltage of the second control node QB to the gate-off voltage VGH. The eighth transistor T8 includes a gate electrode connected to the first control node Q, a first electrode connected to the second control node QB, and a second electrode connected to the VGH node.

FIG. 11 is a circuit diagram showing in detail the control signal generation circuit of the EM driver shown in FIG. 9. Since the control signal generation circuit is substantially the same as that of the above-described embodiment of FIG. 10, a detailed description thereof will be omitted. For example, the buffer BUF in FIG. 11 has a different configuration than the buffer BUF in FIG. 10. In FIG. 11, the buffer BUF includes transistors Tup1, Tup2, Tdn1, and Tdn2 connected to first and second output nodes OUT1 and OUT2. The feedback lines FL1 and FL2 are connected to the EM line GL of the display panel, and the second output node OUT of the signal transfer part separated from the second output node OUT.

FIG. 12 is a diagram showing an example of single-feeding an EM line by controlling a clock input to EM drivers. For example, in single-feeding, an EM line is only supplied with a signal from one side of the EM line.

Referring to FIG. 12, the timing controller TCON generates a gate timing control signal for controlling each of the gate drivers 121L to 122R. For example, the timing controller TCON compares the feedback signals FB1 and FB2 received from the EM drivers 122L and 122R with a normal pattern, determines whether the feedback signals FB1 and FB2 match with the normal pattern (e.g., a predetermined pattern stored in memory), and controls each of the EM drivers 122L and 122R such that the driving of the EM driver that generates an abnormal output can be stopped.

The timing controller TCON can control clocks ECLK1 and ECLK2 input to the EM driver that is operating abnormally, for example, if the first EM driver 122L is operating abnormally, then its control clocks ECLK1 and ECLK2 can be changed to a constant DC voltage of the gate-off voltage VGH, as shown in FIG. 12, in order to shut down the first EM driver 122L. In this situation, since the voltages of the first and second control nodes Q and QB of the first EM driver 122L are fixed to the gate-off voltage VGH, the output node OUT1 is floated and the output node OUT1 and the EM line GL are electrically separated. In this situation, when the clocks ECLK1 and ECLK2 input to the second EM driver 122R are generated as normal waveforms swinging between the gate-on voltage VGL and the gate-off voltage VGH, the EM pulse output from the second EM driver 122R is single-fed to the EM line GL. Thus, if the first EM driver 122L is operating abnormally while the second EM driver 122R is still operating normally, then the first EM driver 122L can be electrically separated from the corresponding EM line GL and the corresponding EM line GL can be driven by only the second EM driver 122R.

Figure 13:
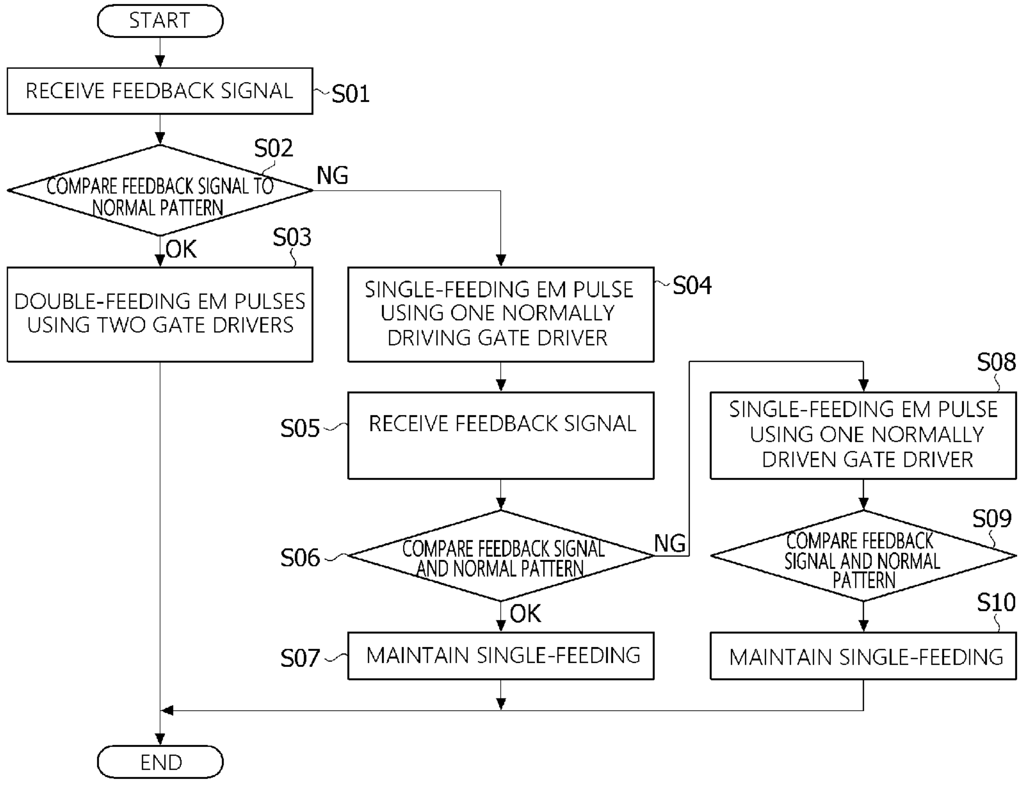
FIG. 13 is a flow chart showing a control method of an EM driver according to one embodiment of the present disclosure.
Figure 14:
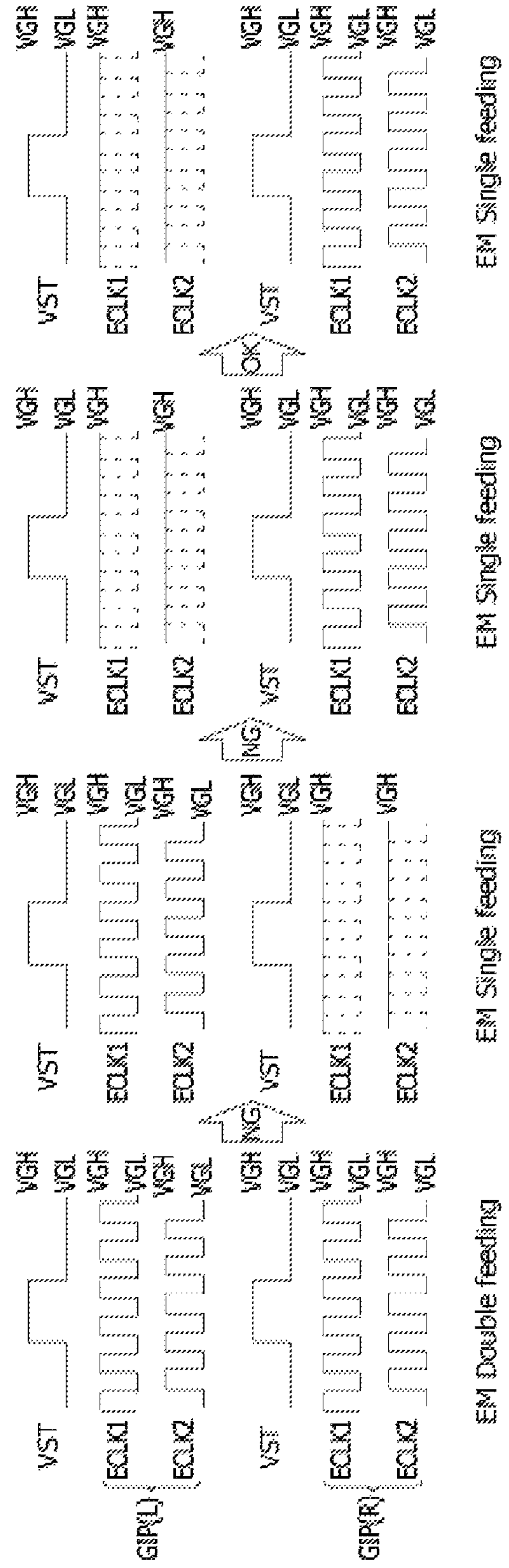
FIG. 14 is a waveform diagram showing a control method of an EM driver according to one embodiment of the present disclosure.

FIG. 13 is a flow chart showing a control method of the EM driver according to one embodiment of the present disclosure. FIG. 14 is a waveform diagram showing a control method of an EM driver according to one embodiment of the present disclosure. In FIG. 14, "GIP(L)" represents the first EM driver 122L, and "GIP(R)" represents the second EM driver 122R.

Referring to FIGS. 13 and 14, the timing controller TCON can control the EM drivers GIP(L) and GIP(R) in the same order as shown in FIG. 13 in an EM check mode. The EM check mode can be activated when the power of the display device is turned on or off, set to a preset time or a preset recurring interval for checking the EM drivers GIP(L) and GIP(R), or when an abnormal pattern is detected from the feedback signals FB1 and FB2.

The timing controller TCON compares the feedback signals FB1 and FB2 with a normal pattern while the EM pulses output from the first and second EM drivers GIP(L) and GIP(R) are double-fed to the EM line GL to monitor whether the EM drivers GIP(L) and GIP(R) are operating normally, in real time (S01, S02). If a bad pattern NG (e.g., not good) is not detected from the feedback signals FB1 and FB2 (OK), the timing controller TCON maintains a double-feeding method by maintaining the clocks input to the first and second EM drivers GIP(L) and GIP(R) as normal waveforms (S03).

When a bad pattern NG is detected from the feedback signals FB1 and FB2, the timing controller TCON converts the EM pulse to a single-feeding method. Firstly, the timing controller TCON direct-currentizes the gate timing control signals that control the clocks ECLK1 and ECLK2 transmitted to the second EM driver GIP(R), and inputs the DC voltage of the gate-off voltage VGH to the EM driver GIP(R), such that the second EM driver GIP(R) can be disabled. In this situation, the clocks ECLK1 and ECLK2 transmitted to the first EM driver GIP(L) are generated as normal waveforms, such that the EM pulse output from the first EM driver GIP(L) is primary single-fed to the EM line GL (S04).

Thus, when the EM pulse is primary single-fed to the EM line, the timing controller TCON monitors the feedback signals FB1 and FB2 and if the abnormal bad pattern NG is not detected (OK), the current primary single-feeding method is maintained (S05, S06, and S07) (e.g., single driving with the first EM driver GIP(L) is maintained). Meanwhile, if a bad pattern NG is detected again in the feedback signals FB1 and FB2 received during the primary single-feeding using the first EM driver GIP(L), the timing controller TCON changes the single-feeding in reverse (S08) (e.g., the second EM driver that was previously neutralized is reactivated, and the first EM is neutralized this time instead). During a secondary single-feeding attempt, the timing controller TCON controls the clocks ECLK1 and ECLK2 transmitted to the first EM driver GIP(L) to the DC voltage of the gate-off voltage VGH, while the clocks ECLK1 and ECLK2 transmitted to the second EM driver GIP(R) are generated as normal waveforms. During the secondary single-feeding attempt, the EM pulse output from the second EM driver GIP(R) is single-fed to the EM line GL. During the secondary single-feeding, the timing controller TCON monitors the feedback signals FB1 and FB2, and if a bad pattern NG is not detected, the current secondary single-feeding method is maintained (S09 and S10) (e.g., single driving with the second EM driver GIP(R) is maintained).

When a bad pattern NG (e.g., pattern not good) is detected from the feedback signals FB1 and FB2 in both the primary single-feeding and the secondary single-feeding methods, the timing controller TCON can restart the EM drivers GIP(L) and GIP(R) after applying a disable signal to the power supply 150 to enter a power off mode. For example, the device can first attempt single driving using only the first EM driver GIP(L) to drive the corresponding the EM line GL. If that attempt does not work, then the device can attempt single driving using only the second EM driver GIP(R) to drive the corresponding the EM line GL. And, if that second attempt still does not work, then the device can automatically restart or reboot itself.

As shown in FIG. 9, when the feedback signals FB1 and FB2 are generated from the second output node OUT2 of the EM drivers GIP(L) and GIP(R), that first and second feedback lines FL1 and FL2 are not short circuited through the EM line GL. In this situation, the timing controller TCON can monitor the first and second feedback signals FB1 and FB2 to know which of the EM drivers GIP(L) and GIP(R) is abnormally operated without relying on the primary and secondary single-feeding methods, as shown in FIG. 15.

Figure 15:
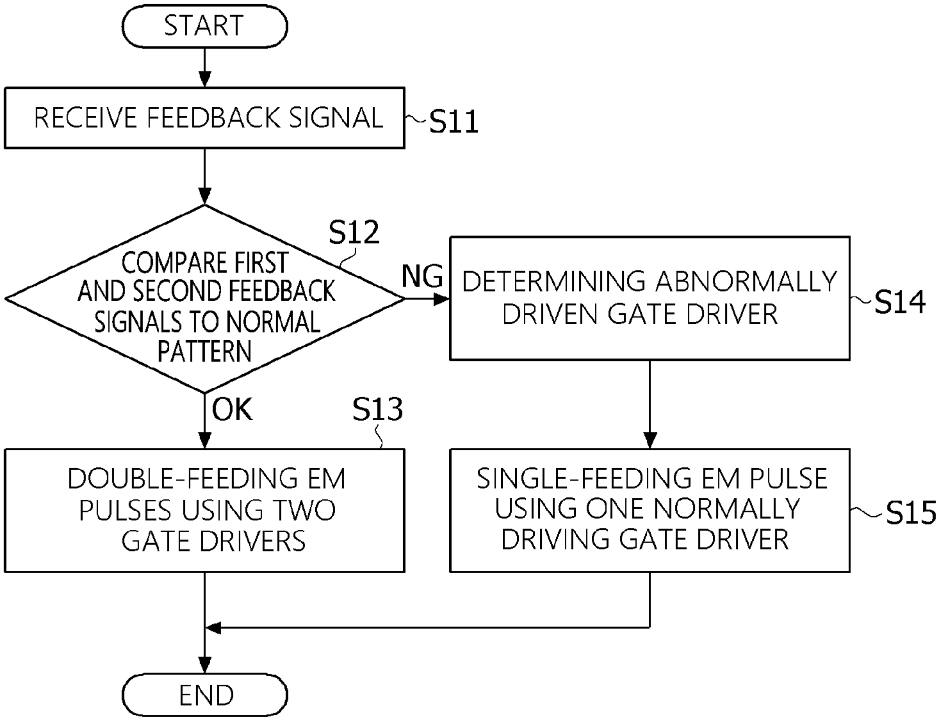
FIG. 15 is a flow chart showing a control method of an EM driver according to another embodiment of the present disclosure.
Figure 16:
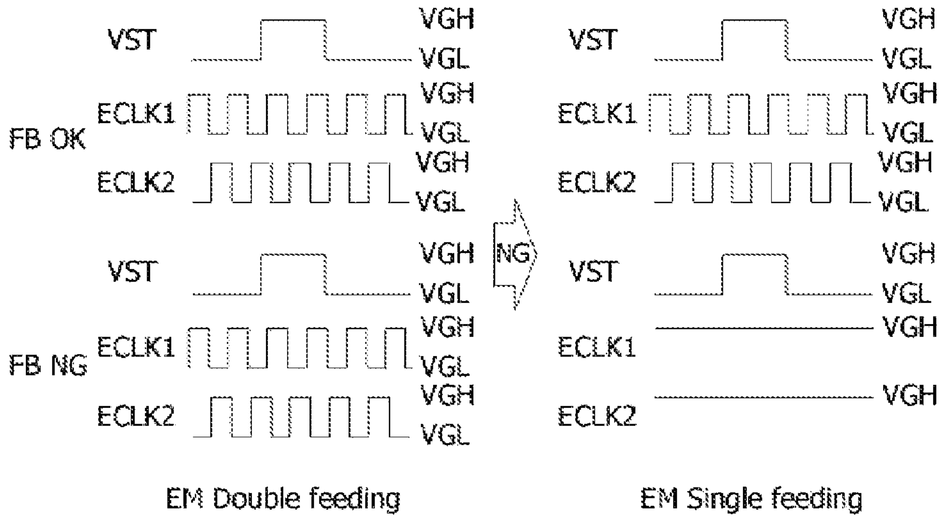
FIG. 16 is a waveform diagram showing a control method of an EM driver according to another embodiment of the present disclosure.

FIG. 15 is a flow chart showing a method for controlling an EM driver according to one embodiment of the present disclosure. FIG. 16 is a waveform diagram showing a method for controlling an EM driver according to another embodiment of the present disclosure.

Referring to FIGS. 15 and 16, while the EM pulses output from the first and second EM drivers GIP(L) and GIP(R) are double-fed to the EM line GL, the timing controller TCON compares each of the feedback signal FB1 and FB2 with a normal pattern to monitor in real time whether the EM drivers GIP(L) and GIP(R) are operating normally (S11 and S12). If a bad pattern NG is not detected (OK) among the feedback signals FB1 and FB2, the timing controller TCON maintains the double-feeding method by maintaining the clocks ECLK1 and ECLK2 input to the first and second EM drivers GIP(L) and GIP(R) as normal waveforms (S13).

When a bad pattern NG is detected from the feedback signals FB1 and FB2, the timing controller TCON disables the abnormal driving EM driver in which the bad pattern NG is detected and converts the EM pulses to a single-feeding method S14 and S15. For example, when a bad pattern NG is detected from the second EM driver GIP(R), then the timing controller TCON direct-currentizes a gate timing control signal for controlling the clocks ECLK1 and ECLK2 transmitted to the second EM driver GIP(R) and inputs a DC voltage of the gate-off voltage VGH to the second EM driver GIP(R) to disable the second EM driver GIP(R). In this situation, the clocks ECLK1 and ECLK2 transmitted to the first EM driver GIP(L) are generated as normal waveforms, and the EM pulse output from the first EM driver GIP(L) is single-fed to the EM line GL (S04).

When a bad pattern NG is detected in both of the first and second feedback signals FB1 and FB2, the timing controller TCON can apply a disable signal to the power supply 150 to enter a power off mode of the display panel, and then restart the display panel drivers GIP(L) and GIP(R).

Figure 20:
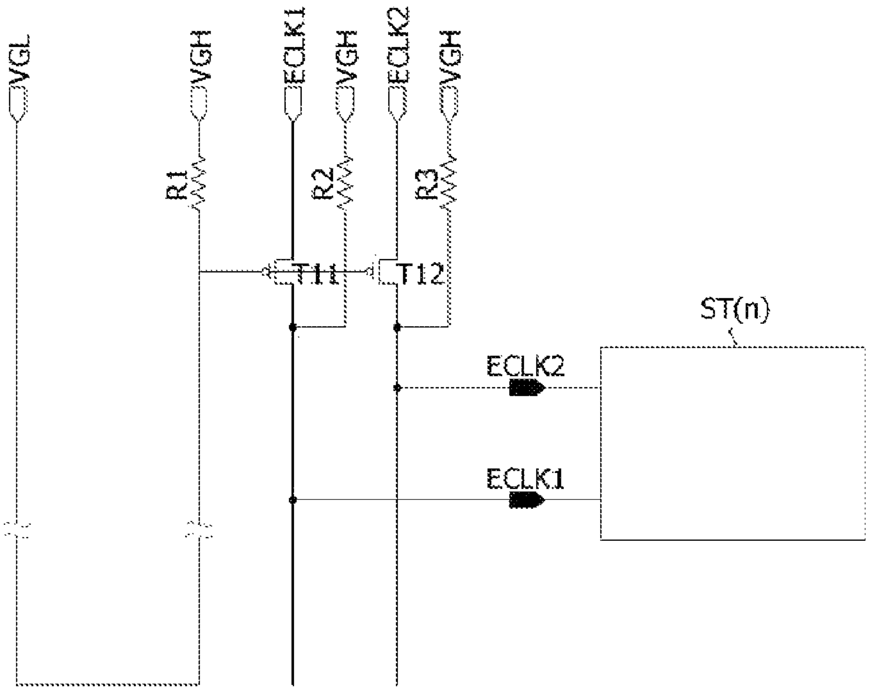
FIGS. 20 and 21 are circuit diagrams showing a clock switching circuit according to one embodiment of the present disclosure.
Figure 21:
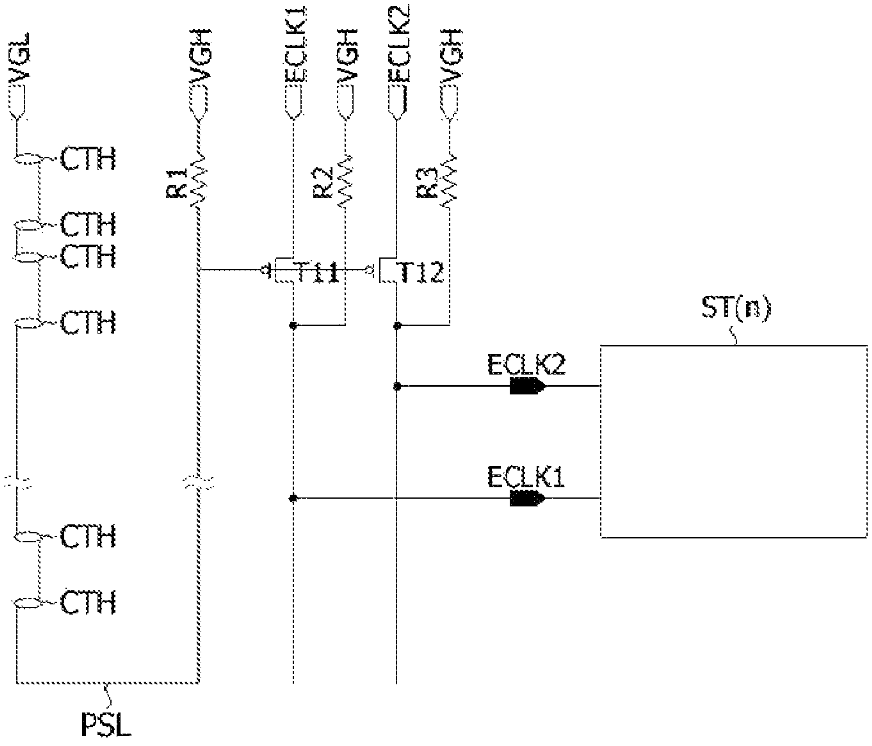

When any one of the EM drivers GIP(L) and GIP(R) starts to operate abnormally due to physical damage of the display panel PNL, in the present disclosure, the output of the EM driver that is abnormally driven is blocked by using a clock switching circuit as shown in FIGS. 20 and 21, so that the EM pulse supply method can be automatically switched to a single-feeding method and the device can continue to operate and display images correctly without the user ever noticing any issues, in a seamless manner.

Figure 17:
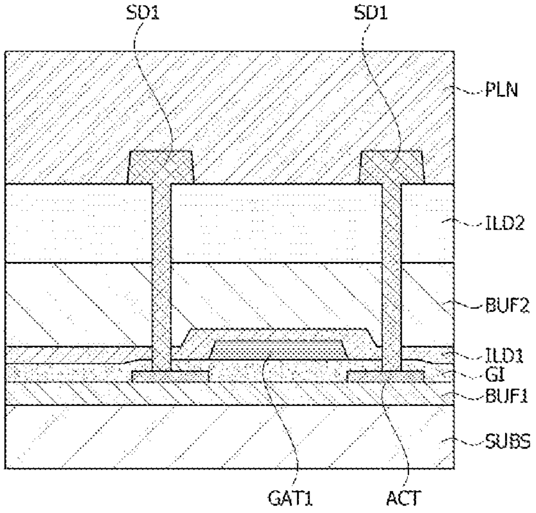
FIG. 17 is a cross-sectional view schematically showing a cross-sectional structure of a transistor disposed on a circuit layer of a display panel according to an embodiment of the present disclosure.

FIG. 17 is a cross-sectional view schematically illustrating a cross-sectional structure of a transistor disposed on a circuit layer of a display panel.

Referring to FIG. 17, the display panel PNL includes metal layers GAT1 and SD1 disposed with insulating layers BUF1, GI, ILD1, BUF2, ILD2, and PLN interposed therebetween.

A first buffer layer BUF1 can be formed on the substrate SUBS. A semiconductor pattern ACT can be disposed on the first buffer layer BUF1. The semiconductor pattern ACT includes a semiconductor pattern of a TFT. The gate insulating layer GI is disposed on the gate insulating layer GI to cover the semiconductor pattern ACT. A first metal pattern GAT1 is disposed on the gate insulating layer GI. The first metal pattern GAT1 can include a gate electrode of a TFT. A first intermediate insulating layer ILD1 is disposed on the gate insulating layer GI to cover the first metal pattern GAT1. A second buffer layer BUF2 can be disposed on the first intermediate insulating layer ILD1, and a second intermediate insulating layer ILD2 can be disposed on the second buffer layer BUF2. A second metal pattern SD1 can be disposed on the second intermediate insulating layer ILD2. The second metal pattern SD1 can include first and second electrodes (or source and drain electrodes) of the TFT. The first and second electrodes of the TFT can be in contact with the semiconductor pattern ACT through a contact hole CTH passing through the underlying insulating layers GI, ILD1, BUF2, and ILD2. A planarization layer PLN can be disposed on the second intermediate insulating layer ILD2 to cover the second metal pattern SD1.

Figure 18:
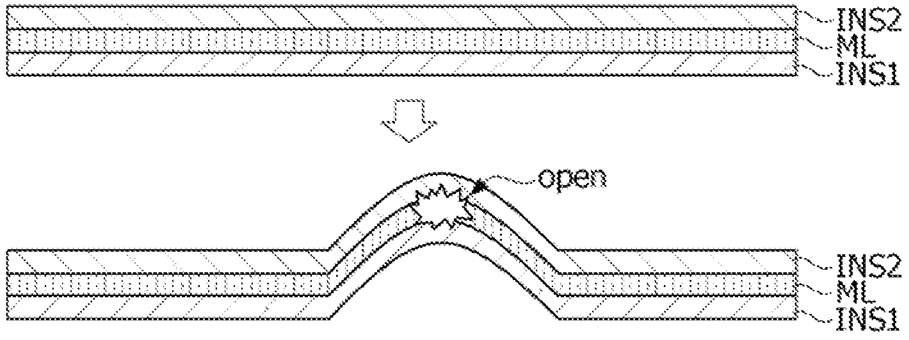
FIG. 18 is a cross-sectional view illustrating an example in which a wiring of a single metal layer is disconnected in a deformed portion of a display panel according to an embodiment of the present disclosure.
Figure 19:
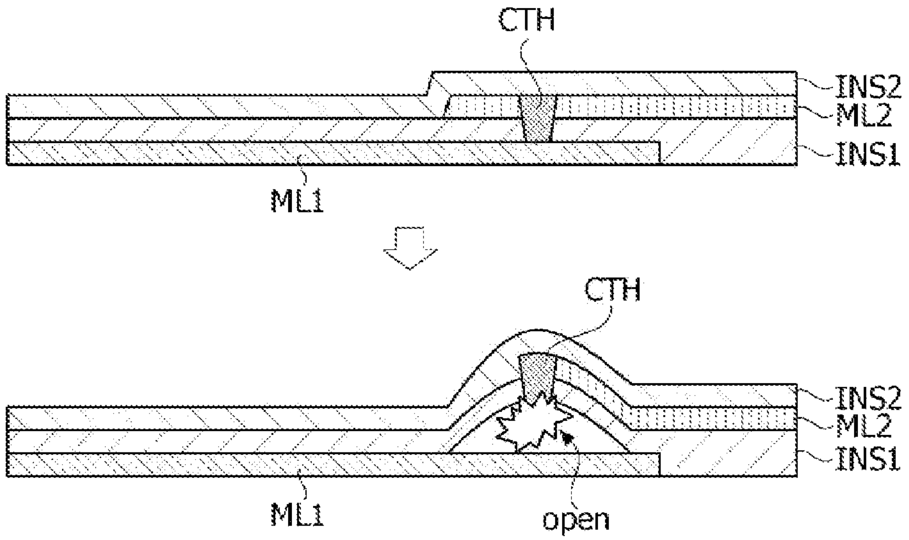
FIG. 19 is a cross-sectional view illustrating an example in which two metal layers connected through a contact hole are disconnected in a deformed portion of a display panel according to an embodiment of the present disclosure.

When a physical impact is applied to the display panel PNL or the display panel PNL is bent (e.g., if a thin display panel or a flexible display panel is overly bent), the EM driver GIP(L) or GIP(R) may start to operate abnormally because the metal layer can become disconnected or a dielectric breakdown can occur between the metal layers, as shown in FIGS. 18 and 19. FIG. 18 is an example in which wirings of a single metal layer are disconnected, and FIG. 19 is an example in which two metal layers connected through a contact hole are disconnected.

Referring to FIG. 18, a metal layer ML can be disposed between the insulating layers INS1 and INS2. The metal layer ML can be disconnected at a portion where the display panel PNL is bent.

Referring to FIG. 19, a first metal layer ML1, a first insulating layer INS1, a second metal layer ML2, and a second insulating layer INS2 are stacked on each other, and the second metal layer ML2 is connected to the first metal layer ML1 through the contact hole CTH penetrating through the first insulating layer INS1. At a portion in which the display panel PNL is bent, the metal layers ML1 and ML2 connected through the contact hole CTH can become separated from each other, so that a signal or power path can be blocked (e.g., the metal in the contact hole CTH can be lifted away and disconnected from metal layer ML1, breaking the electrical connection).

In FIGS. 18 and 19, the metal layers ML, ML1, and ML2 can be the metal patterns GAT1 and SD1 shown in FIG. 17, and the insulating layers INS1 and INS2 can be the insulating layers BUF1, GI, ILD1, BUF2, ILD2, and PLN.

Figure 22:
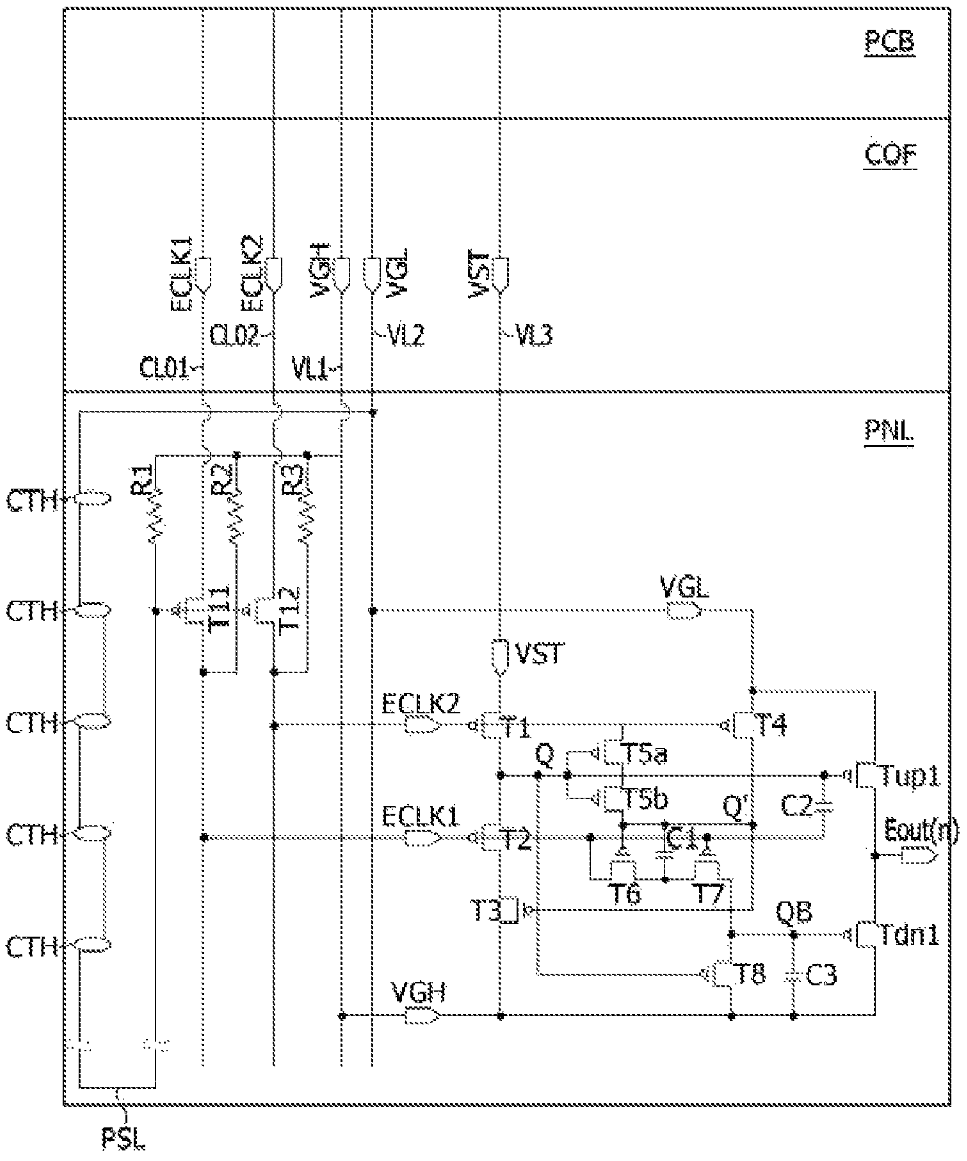
FIG. 22 is a plan view showing in detail wirings connected to a clock switching circuit according to an embodiment of the present disclosure.
Figure 23:
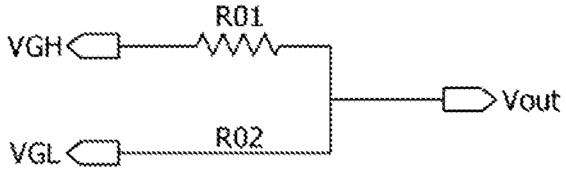
FIGS. 23 to 26 are diagrams illustrating examples in which a voltage controlling a transistor is changed to a gate-off voltage when an auxiliary power line is disconnected according to an embodiment of the present disclosure.

FIGS. 20 to 22 are circuit diagrams showing a clock switching circuit according to one embodiment of the present disclosure.

Referring to FIGS. 20 to 22, the clock switching circuit can be disposed on the left and right sides of the display panel to be connected to the first EM driver GIP(L) and the second EM driver GIP(R), respectively. For example, the clock switching circuit can include a first clock switching circuit connected to the CLK node of the first EM driver GIP(L) by being disposed adjacent to the first EM driver GIP(L) or being at least partially overlapped with the first EM driver GIP(L), and a second clock switching circuit connected to the CLK node of the second EM driver GIP(R) by being disposed close to the second EM driver GIP(R) or being at least partially overlapped with the second EM driver GIP(R).

Each of the first and second clock switching circuits includes an auxiliary power line PSL and transistors T11 and T12 to selectively supply the clocks ECLK1 and ECLK2 and the gate-off voltage VGH to the EM drivers GIP(L) and GIP(R). The number of transistors T11 and T12 corresponds to the number of clocks input to the signal transfer part. For example, when only one clock is input to the signal transfer part, one transistor is required.

A gate-on voltage VGL is applied to one end of the auxiliary power line PSL, and a first resistor R1 to which the gate-off voltage VGH is applied is connected to the other end.

The first transistor T11 is turned on when the gate-on voltage VGL is applied to its gate electrode through the auxiliary power line PSL to transfer the first clock ECLK1 to a first CLK node of the EM drivers GIP(L) and GIP(R). The first transistor T11 is turned off when the auxiliary power line PSL is disconnected to block the transmission path of the first clock ECLK1. The first transistor T11 includes a gate electrode connected to a node between the auxiliary power line PSL and the first resistor R1, a first electrode to which the first clock ECLK1 is applied, and a second electrode connected to a second resistor R2 and the first CLK node. The second resistor R2 is connected between the first transistor T11 and the first CLK node, and a gate-off voltage VGH is applied.

The second transistor T12 is turned on when the gate-on voltage VGL is applied to its gate electrode through the auxiliary power line PSL to transfer the second clock ECLK2 to the second CLK node of the EM drivers GIP(L) and GIP(R). The second transistor T12 is turned off when the auxiliary power line PSL is disconnected to block the transmission path of the second clock ECLK2. The second transistor T12 includes a gate electrode connected to a node between the auxiliary power line PSL and the first resistor R1, a first electrode to which the second clock ECLK2 is applied, and a second electrode connected to a third resistor R3 and the second CLK node. The third resistor R3 is connected between the second transistor T12 and the second CLK node, and a gate-off voltage VGH is applied.

In FIGS. 20 and 21, the clock switching circuit is illustrated as being separated from the EM drivers 122L and 122R on a plane, but is not limited thereto. For example, at least a portion of the clock switching circuit can be overlapped with the EM drivers 122L and 122R. The auxiliary power line PSL can include a bending pattern including at least one bending part or a "U"-shaped pattern.

The auxiliary power line PSL is formed on the display panel PNL as a wiring of a single metal layer as shown in FIG. 18 or formed as wirings of two metal layer connected through a contact hole CTH as shown in FIG. 19.

The clock switching circuit is disposed on the display panel PNL as shown in FIG. 22. Clock lines CL01 and CL02 and power lines VL1 and VL2 connected to the clock switching circuit can be connected to the timing controller TCON through a level shifter LS across a COF and a printed circuit board PCB.

The clock switching circuit is disposed on the display panel PNL as shown in FIG. 22. The clock lines CL01 and CL02 and the power lines VL1 and VL2 connected to the clock switching circuit can be connected to the timing controller TCON through the level shifter LS across the COF and the printed circuit board PCB.

Figure 24:
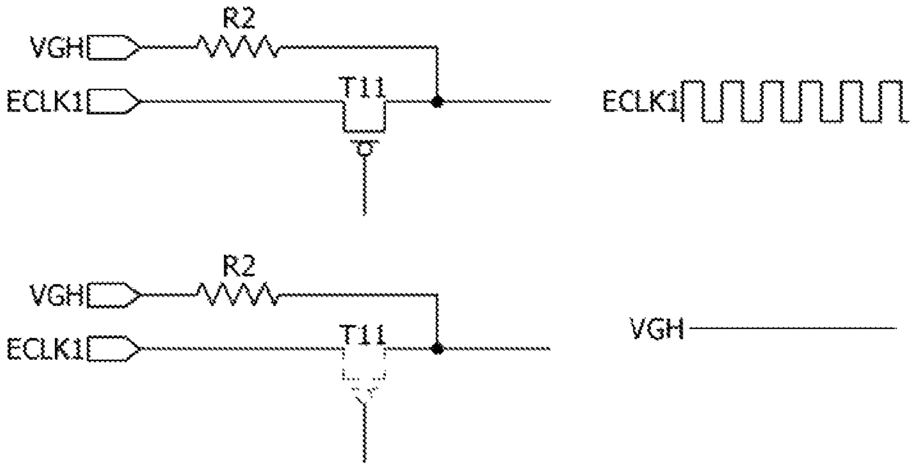
Figure 25:
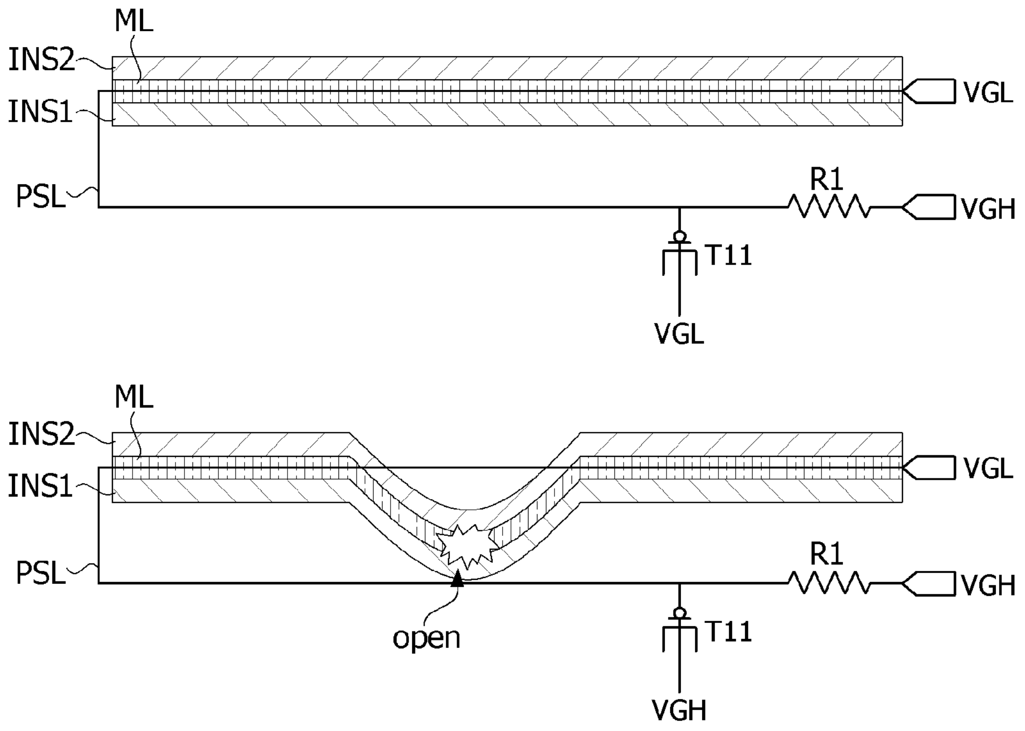
Figure 26:
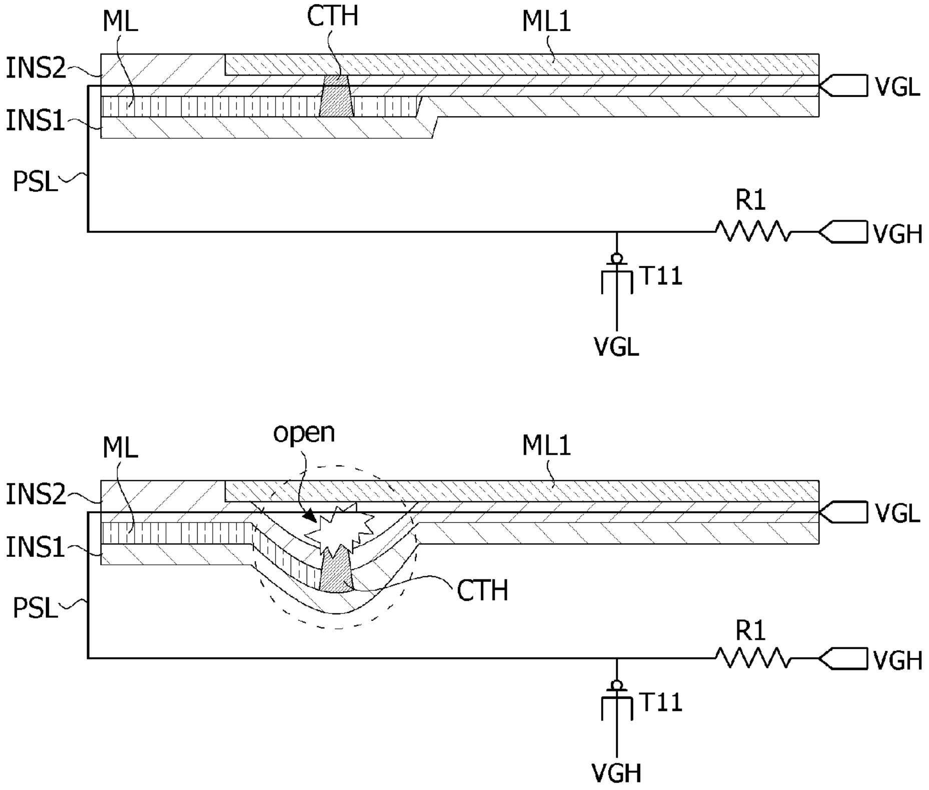

The auxiliary power line PSL and the resistors R1, R2, and R3 turn off the transistors T11 and T12 when the auxiliary power line PSL is disconnected to block the clocks ECLK1 and ECLK2 input to the CLK node of the EM drivers the ECLK1 and ECLK2, and a DC voltage of the gate-off voltage VGH level is supplied to the CLK node. This will be described in detail with reference to FIGS. 23 to 26. FIGS. 25 and 26 are diagrams showing the disconnection of the auxiliary power line PSL when the wiring of the metal layer is disconnected due to deformation of the display panel PNL.

Referring to FIGS. 23 to 26, a resistor R02 can have a resistance value capable of separating the gate-off voltage VGH and the gate-on voltage VGL. The voltage Vout output from a node between the resistor R02 and the auxiliary power line PSL is follows:

$$Vout = VGL + \frac{R02}{R01 + R02} \times (VGH - VGL).$$

When a resistance R01 to which the gate-off voltage VGH is applied is sufficiently greater than the resistance R02 of the auxiliary power line PSL, the voltage Vout applied to the gate electrodes of the transistors T11 and T12 is substantially equal to the gate-on resistance VGL. Therefore, when the auxiliary power line PSL is not disconnected, the transistors T11 and T12 maintain an on-state to supply the clocks ECLK1 and ECLK2 to the CLK node of the EM drivers GIP(L) and GIP(R), as shown in FIG. 24. Meanwhile, when the auxiliary power line PSL is disconnected due to deformation or excessive bending of the display panel PNL, since the voltages applied to the gate electrodes of the transistors T11 and T12 are changed to the gate-off voltage VGH, the transistors T11 and T12 are turned off to apply the gate-off voltage VGH to the CLK node of the EM drivers GIP(L) and GIP(R), as shown in FIG. 24. The EM drivers GIP(L) and GIP(R), to which the gate-off voltage VGH is continuously applied to the CLK node, are disabled so that EM pulses are not generated and power consumption is not generated.

Figure 27:
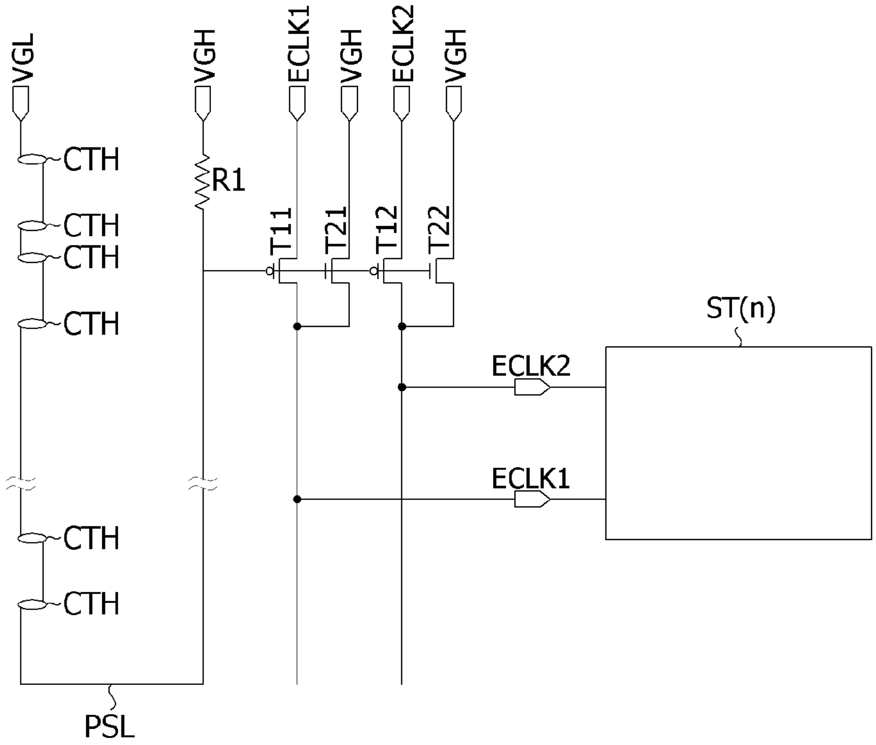
FIG. 27 is a circuit diagram showing a clock switching circuit according to another embodiment of the present disclosure.

FIG. 27 is circuit diagrams showing a clock switching circuit according to another embodiment of the present disclosure.

Referring to FIG. 27, the clock switching circuit includes an auxiliary power line PSL, p-channel transistors T11 and T12, and n-channel transistors T21 and T22. The number of transistors T11, T12, T21, and T22 corresponds to the number of clocks input to the signal transfer part.

The auxiliary power line PSL can be formed on the display panel PNL as a wiring of a single metal layer as shown in FIG. 18 or as wirings of two metal layer connected through a contact hole CTH as shown in FIG. 19.

A gate-on voltage VGL is applied to one end of the auxiliary power line PSL, and a first resistor R1 to which a gate-off voltage VGH is applied is connected to the other end. The first and second p-transistors T11 and T12 can be turned off depending on the gate-off voltage applied through the first resistor R1 when the auxiliary power line PSL is disconnected.

The first p-channel transistor T11 is turned on when the gate-on voltage VGL is applied to its gate electrode through the auxiliary power line PSL to transfer the first clock ECLK1 to the first CLK node of the EM drivers GIP(L) and GIP(R). The first p-channel transistor T11 is turned off when the auxiliary power line PSL is disconnected to block the transmission path of the first clock ECLK1. The first p-channel transistor T11 includes a gate electrode connected to a node between the auxiliary power line PSL and the first resistor R1, a first electrode to which the first clock ECLK1 is applied, and a second electrode connected to the first CLK node.

The first n-channel transistor T21 operates complementarily with the first p-channel transistor T11 and is turned off when the first p-channel transistor T11 is turned on, while the first n-channel transistor T21 is turned on to transfer the gate-off voltage VGH to the first CLK node of the EM drivers GIP(L) and GIP(R) when the first p-channel transistor T11 is turned off. The first n-channel transistor T21 is turned off depending on the gate-on voltage VGL and turned on in response to the gate-off voltage VGH. The first n-channel transistor T21 includes a gate electrode connected to a node between the auxiliary power line PSL and the first resistor R1, a first electrode to which a gate-off voltage VGH is applied, and a second electrode connected to the first CLK node.

The second p-channel transistor T12 is turned on when the gate-on voltage VGL is applied to its gate electrode through the auxiliary power line PSL to transfer the second clock ECLK2 to the second CLK node of the EM drivers GIP(L) and GIP(R). The second transistor T12 is turned off when the auxiliary power line PSL is disconnected to block the transmission path of the second clock ECLK2. The second transistor T12 includes a gate electrode connected to a node between the auxiliary power line PSL and the first resistor R1, a first electrode to which the second clock ECLK2 is applied, and a second electrode connected to the second CLK node.

The second n-channel transistor T22 operates complementarily with the second p-channel transistor T12 and is turned off when the second p-channel transistor T12 is turned on, while the second p-channel transistor T12 is turned on to transfer the gate-off voltage VGH to the second CLK node of the EM driver GIP(L) and GIP(R) when the second p-channel transistor T12 is turned off. The second n-channel transistor T22 is turned off depending on the gate-on voltage VGL and turned on in response to the gate-off voltage VGH. The second n-channel transistor T22 includes a gate electrode connected to a node between the auxiliary power line PSL and the first resistor R1, a first electrode to which the gate-off voltage VGH is applied, and a second electrode connected to the second CLK node.

The objects to be achieved by the present disclosure, the means for achieving the objects, and advantages and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display panel comprising:
- a plurality of data lines configured to receive data signals;
- a plurality of gate lines configured to receive a gate pulse;
- a plurality of pixel circuits, each of the plurality of pixel circuits being connected to one of the plurality of data lines and one of the plurality of gate lines;
- a first gate driving circuit configured to supply the gate pulse to first ends of the plurality of gate lines;
- a second gate driving circuit configured to supply the gate pulse to second ends of the plurality of gate lines;
- a first feedback line connected to an output node of the first gate driving circuit;
- a second feedback line connected to an output node of the second gate driving circuit;
- a first clock line configured to supply a clock signal to a clock node of the first gate driving circuit; and
- a second clock line configured to supply the clock signal to a clock node of the second gate driving circuit, wherein the first and second gate driving circuits are configured to:

double-feed the gate pulse to a corresponding gate line among the plurality of gates lines from opposite ends of the corresponding gate line, and in response to one of the first and second gate driving circuits operating abnormally, single-feed the gate pulse to the corresponding gate line from only a remaining one of the first and second gate driving circuits, wherein the first gate driving circuit and the second gate driving circuit are configured to:

receive the clock signal when the gate pulse is double-fed to the corresponding gate line, and receive a direct current voltage at the clock node of one of the first gate driving circuit and the second gate driving circuit when the gate pulse is single-fed to the corresponding gate line, wherein the clock signal swings between a gate-on voltage and a gate-off voltage, and wherein the direct current voltage maintains the gate-off voltage while the gate pulse is single-fed to the corresponding gate line.

2. The display panel according to claim 1, wherein the first and second feedback lines are directly connected to one of the plurality of gate lines.

3. The display panel according to claim 1, wherein the first and second feedback lines are electrically separated from the plurality of gate lines.

4. The display panel according to claim 3, wherein each of the plurality of pixel circuits includes:

a light emitting element including an anode electrode and a cathode electrode;

a driving element configured to supply a current to the light emitting element; and at least one of a switch element configured to supply a pixel driving voltage in response to the gate pulse and a switch element configured to form a current path between the driving element and an anode electrode of the light emitting element in response to the gate pulse.

5. The display panel according to claim 3, wherein the first gate driving circuit includes:

a first-first output node connected to the corresponding gate line to output the gate pulse; and a first-second output node connected to the first feedback line, wherein the second gate driving circuit includes:

a second-first output node connected to the corresponding gate line to output the gate pulse; and a second-second output node connected to the second feedback line.

6. The display panel according to claim 1, wherein each of the first gate driving circuit and the second gate driving circuit includes at least one switch element, and wherein the at least one switch element is turned on with the gate-on voltage and turned off with the gate-off voltage.

7. The display panel according to claim 6, further comprising:

a first clock switching circuit connected to the clock node of the first gate driving circuit to selectively supply the clock signal and the gate-off voltage; and a second clock switching circuit connected to the clock node of the second gate driving circuit to selectively supply the clock signal and the gate-off voltage, wherein each of the first and second clock switching circuits includes:

an auxiliary power line connected to a first resistor, a first end of the first resistor being configured to receive the gate-on voltage and a second end of the first resistor being configured to receive the gate-off voltage;

a transistor configured to turn on in response to receiving the gate-on voltage through the auxiliary power line to supply the clock signal to the clock node; and a second resistor connected between the transistor and the clock node.

8. The display panel according to claim 7, wherein the transistor is configured to turn off in response to the gate-off voltage being applied through the first resistor when the auxiliary power line is disconnected.

9. The display panel according to claim 7, wherein the auxiliary power line includes a single metal layer wiring or two metal layer wirings connected through a contact hole in an insulating layer.

10. The display panel according to claim 6, further comprising:

a first clock switching circuit connected to the clock node of the first gate driving circuit to selectively supply the clock signal and the gate-off voltage; and a second clock switching circuit connected to the clock node of the second gate driving circuit to selectively to supply the clock and the gate-off voltage, wherein each of the first and second clock switching circuits includes:

an auxiliary power line connected to a first resistor, a first end of the first resistor being configured to receive the gate-on voltage and a second end of the first resistor being configured to receive the gate-off voltage;

a p-channel transistor including a gate electrode connected to a node between the auxiliary power line and the first resistor, the p-channel transistor being configured to turn on based on the gate-on voltage to supply the clock signal to the clock node; and an n-channel transistor including a gate electrode connected to the node between the auxiliary power line and the first resistor, the n-channel transistor being configured to turn off based on the gate-on voltage and turn on based on the gate-off voltage to supply the gate-off voltage to the clock node.

11. The display panel according to claim 10, wherein the p-channel transistor is configured to turn off based on the gate-off voltage applied through the first resistor when the auxiliary power line is disconnected.

12. The display panel according to claim 10, wherein the auxiliary power line includes a single metal layer wiring or two metal layer wirings connected through a contact hole in an insulating layer.

13. The display panel according to claim 1, wherein each of the first and second gate driving circuits includes a first output node connected to the corresponding gate line to output the gate pulse, wherein the first feedback line is connected to a first-first output node of the first gate driving circuit, and wherein the second feedback line is connected to a second-first output node of the second gate driving circuit.

14. A display panel comprising:

a plurality of data lines configured to receive data signals;

a plurality of gate lines configured to receive a gate pulse;

a plurality of pixel circuits, each of the plurality of pixel circuits being connected to one of the plurality of data lines and one of the plurality of gate lines;

a first gate driving circuit configured to supply the gate pulse to first ends of the plurality of gate lines;

a second gate driving circuit configured to supply the gate pulse to second ends of the plurality of gate lines;

a first clock switching circuit configured to selectively supply a clock signal and a direct current voltage to a clock node of the first gate driving circuit; and a second clock switching circuit configured to selectively supply the clock signal and the direct current voltage to a clock node of the second gate driving circuit, wherein the first and second gate driving circuits are configured to:

double-feed the gate pulse to a corresponding gate line among the plurality of gate lines from opposite ends of the corresponding gate line, and in response to one of the first and second gate driving circuits failing, single-feed the gate pulse to the corresponding gate line from only a remaining one of the first and second gate driving circuits, wherein the first gate driving circuit and the second gate driving circuit are configured to:

receive the clock signal when the gate pulse is double-fed to the corresponding gate line, and receive a direct current voltage at the clock node of one of the first gate driving circuit and the second gate driving circuit when the gate pulse is single-fed to the corresponding gate line, wherein the clock signal swings between a gate-on voltage and a gate-off voltage, and wherein the direct current voltage maintains the gate-off voltage while the gate pulse is single-fed to the corresponding gate line.

15. A display device comprising:

a display panel including:

a plurality of data lines, a plurality of gate lines, a plurality of pixel circuits, a first gate driving circuit configured to supply a gate pulse to first ends of the plurality of gate lines, a second gate driving circuit configured to supply the gate pulse to second ends of the plurality of gate lines, a first feedback line connected to an output node of the first gate driving circuit, and a second feedback line connected to an output node of the second gate driving circuit;

a first clock line configured to supply a clock signal to a clock node of the first gate driving circuit; and a second clock line configured to supply the clock signal to a clock node of the second gate driving circuit; and a timing controller configured to:

compare feedback signals from the first and second feedback lines with a previously stored normal pattern, in response to the feedback signals matching the previously stored normal pattern, output the gate pulse from both of the first and second gate driving circuits to double-feed a corresponding gate line among the plurality of gate lines, and in response to at least one of the feedback signals being different than the previously stored normal pattern, output the gate pulse from only one of the first and second gate driving circuits to single-feed a corresponding gate line, wherein the first gate driving circuit and the second gate driving circuit are configured to:

receive the clock signal when the gate pulse is double-fed to the corresponding gate line, and receive a direct current voltage at the clock node of one of the first gate driving circuit and the second gate driving circuit when the gate pulse is single-fed to the corresponding gate line, wherein the clock signal swings between a gate-on voltage and a gate-off voltage, and wherein the direct current voltage maintains the gate-off voltage while the gate pulse is single-fed to the corresponding gate line.

16. The display device according to claim 15, further comprising a level shifter configured to receive a gate timing control signal from the timing controller to generate a clock signal and supply the clock signal to the first and second gate driving circuits.

17. The display device according to claim 16, wherein the level shifter is further configured to:

increase a width of the gate timing control signal to generate a wider gate timing control signal and output the wider gate timing control signal to the first and second gate driving circuits, and reduce a width of at least one of the feedback signals from the first and second feedback lines to generate a narrower feedback signal and output the narrower feedback signal to the timing controller.

* * * * *